(12) United States Patent
Taylor

(10) Patent No.: US 9,189,969 B1
(45) Date of Patent: Nov. 17, 2015

(54) SYSTEM AND METHOD FOR CONTROLLING AN ADVANCING READING SLOT OF A READING AID AT VARIABLE VELOCITIES

(71) Applicant: Fluent Reading Technology, Key Biscayne, FL (US)

(72) Inventor: Stanford E. Taylor, Burlington, VT (US)

(73) Assignee: Fluent Reading Technology, Key Biscayne, FL (US)

( * ) Notice: Subject to any disclaimer, the term of this patent is extended or adjusted under 35 U.S.C. 154(b) by 0 days.

(21) Appl. No.: 14/307,037

(22) Filed: Jun. 17, 2014

(51) Int. Cl.
*G09B 17/00* (2006.01)
*G09B 17/02* (2006.01)

(52) U.S. Cl.
CPC ..................................... *G09B 17/02* (2013.01)

(58) Field of Classification Search
USPC .................. 434/178, 179, 180, 181, 182, 183
See application file for complete search history.

(56) References Cited

U.S. PATENT DOCUMENTS

| | | | |
|---|---|---|---|
| 3,502,406 A | 3/1970 | Macomber | |
| 3,757,432 A | 9/1973 | Taylor | |
| 3,878,327 A | 4/1975 | Uhler | |
| 3,905,695 A | 9/1975 | Taylor | |
| 3,938,139 A | 2/1976 | Day | |
| 4,770,635 A | 9/1988 | Gabay | |
| 6,056,551 A | 5/2000 | Marasco | |
| 6,726,487 B1 | 4/2004 | Dalstrom | |
| 6,925,613 B2 | 8/2005 | Gibson | |
| 7,173,621 B2 | 2/2007 | Reber et al. | |
| 8,360,779 B1 * | 1/2013 | Brennan | 434/181 |
| 2002/0167534 A1 | 11/2002 | Burke | |
| 2007/0202474 A1 | 8/2007 | Miller | |
| 2009/0042172 A1 | 2/2009 | Morris | |
| 2009/0144654 A1 | 6/2009 | Brouwer et al. | |

* cited by examiner

*Primary Examiner* — Kesha Frisby
(74) *Attorney, Agent, or Firm* — Hoffmann & Baron, LLP

(57) ABSTRACT

A system and computerized method is provided that controls a reading slot to provide aid to a user in reading a passage. The computerized method includes generating a mask having an opaque portion and a reading slot. The opaque portion covers a plurality of lines having characters that are visible through the slot. The plurality of lines includes at least a first line and a second line. The method includes advancing the slot at a midline velocity in relation to the first line of the passage, and increasing the velocity of the slot in accordance with a digital transition velocity profile when the slot enters a transition zone of the passage.

32 Claims, 10 Drawing Sheets

SYSTEM AND METHOD FOR CONTROLLING AN ADVANCING READING SLOT OF A READING AID AT VARIABLE VELOCITIES

BACKGROUND

1. Field

The present application relates generally to computerized reading aids. More specifically, the present application is directed to controlling a reading slot of the reading aid at variable velocities.

2. Brief Discussion of Related Art

Reading aids have been available to help readers, from new readers to experienced readers, increase fluency and speed. One type of reading aid is a mask having a reading slot. The mask obscures a portion of a reading passage that a reader intends to read, while a portion of text of the reading passage is exposed through the slot as the slot is advanced in relation to the reading passage. In a mechanical system, the text of the reading passage is provided on a physical page, and the reading slot is mechanically advanced over the text to expose the words to a reader viewing the page. In a projection system, the text of a reading passage is projected onto a screen by a projector. The projector further projects the mask over the text so that it is superimposed on the text. Here too, the slot is mechanically advanced to expose words to a reader that are projected on the screen.

In both the mechanical and projection systems, the reading slot has a fixed length dimension as it is advanced during a reading session in which a reader reads a reading passage. Additionally, the mask has a fixed opacity. More recently, computerized reading aids have become available that display text of a reading passage and a mask that overlays a portion of the text. Similar to the mechanical and projection systems, a reading slot is advanced in relation to the reading passage to help improve the reader's fluency and speed. Here too, the reading slot is advanced at a single velocity during a reading session, the length dimension of reading slot is fixed, and the mask has a fixed opacity.

Readers having varying abilities read at different speeds. Some readers can read faster than others, and some readers can beneficially use their peripheral vision to preview text of the reading passage that is ahead of their current reading position. However, for some readers, an exposure of too many words ahead of the current reading position will encourage a saccade too far to the right. In response, the reader may skip words and/or go back to a reading position to try and read missed words, losing speed and fluency. Thus, some readers may benefit by having less text exposed to their peripheral vision than more experienced readers.

Additionally, a reader of any skill level may read the middle of a line at a different velocity than when transitioning from one line of text to the next. A slot that is advanced at a single velocity throughout a reading passage can thwart a reader's ability to read faster or improve the reader's reading speed. Additionally, in a single reading passage, some types of text (e.g., dense, complicated reading material) may warrant a slower reading velocity than other text. Encouraging the reader to read at a single velocity can interfere with comprehension of text that warrants a slower reading velocity.

Accordingly, it is desirable to provide a configurable reading aid to train a reader to read at a velocity that it is appropriate for the particular reader, e.g., based on the reader's experience and ability. Further, it is desirable to provide a reading aid that also allows the reader to read at different velocities within the same or different reading passages. Additionally, it is desirable to control the exposure of text of a reading passage that can be visible to the reader, such as by the reader's peripheral vision.

SUMMARY

In accordance with an embodiment or aspect, a computerized method of controlling a reading slot to provide aid to a user in reading a passage is disclosed. The computerized method includes generating, by a processing device, a mask having an opaque portion and a reading slot. The opaque portion covers a plurality of lines having characters that are visible through the slot. The plurality of lines includes at least a first line and a second line. The method includes advancing, by the processing device, the slot at a midline velocity in relation to the first line of the passage, and increasing, by the processing device, the velocity of the slot in accordance with a digital transition velocity profile when the slot enters a transition zone of the passage.

The method of controlling the reading slot can further include displaying the mask over the plurality of lines.

The method of controlling the reading slot can further include accessing a reading proficiency of the user.

The method of controlling the reading slot can further include determining an opacity level of the mask based on the reading proficiency of the user.

The method of controlling the reading slot can further include determining the midline velocity based on the reading proficiency of the user.

The method of controlling the reading slot can further include determining a length dimension of the slot based on the reading proficiency of the user.

The slot can include a translucent portion and a semi-opaque portion, and the method of controlling the reading slot can further include setting at least one of a length dimension of the semi-opaque portion and a degree of opaqueness of the semi-opaque portion based on the reading proficiency of the user.

The method of controlling the reading slot can further include determining when the slot enters the transition zone based on a marker associated with the first line of the passage.

The method of controlling the reading slot can further include increasing the velocity of at least one of the slot's lead and trail edges in accordance with the transition velocity profile such that a length dimension increases between the slot's lead and trail edges.

The method of controlling the reading slot can further include adjusting the velocity of the slot's lead and trail edges at different times.

The method of controlling the reading slot can further include decreasing the velocity of at least one of the slot's lead and trail edges in accordance with a digital recovery velocity profile when the slot exits the transition zone.

The method of controlling the reading slot can further include decreasing the velocity of at least one of the slot's lead and trail edges in accordance with the transition velocity profile such that a length dimension decreases between the slot's lead and trail edges, until the length dimension reaches a predetermined dimension.

The method of controlling the reading slot can further include determining when the slot exits the transition zone based on a marker associated with the second line of the passage.

The method of controlling the reading slot can further include adjusting at least one of the slot's position or advancement based on a code related to the passage, wherein the code is embedded in the passage or is associated with the passage.

The method of controlling the reading slot can further include receiving a request to adjust one of a position of the slot, the velocity of the slot, and a velocity of at least one of a lead edge and trail edge of the slot. The method can further include adjusting at least one of the slot position, the velocity of the slot, and the velocity of the at least one of the lead edge and trail edge of the slot.

The method of controlling the reading slot can further include receiving feedback information from the user in response to the request to adjust. The method can further include adjusting, based on the feedback information, at least one of: a selected distance for the position of the slot, an amount for velocity of the slot, and an amount for the velocity of the at least one of the lead edge and trail edge of the slot.

In accordance with a further embodiment aspect, a system is disclosed to control a reading slot to provide aid to a user in reading a passage. The system includes a processing device and a memory device. The memory device stores instructions that, when executed by the processing device, cause the processing device to perform the following operations. The operations include generating a mask having an opaque portion and a reading slot. The opaque portion covers a plurality of lines having characters that are visible through the slot. The plurality of lines includes at least a first line and a second line. The operations further include advancing the slot at a midline velocity in relation to the first line of the passage, and increasing the velocity of the slot in accordance with a digital transition velocity profile when the slot enters a transition zone of the passage.

The operations can further include displaying the mask over the plurality of lines.

The operations can further include accessing a reading proficiency of the user.

The operations can further include determining an opacity level of the mask based on the reading proficiency of the user.

The operations can further include determining the midline velocity based on the reading proficiency of the user.

The operations can further include determining a length dimension of the slot based on the reading proficiency of the user.

The slot can include a translucent portion and a semi-opaque portion. The operations can further include setting at least one of a length dimension of the semi-opaque portion and a degree of opaqueness of the semi-opaque portion based on the reading proficiency of the user.

The operations can further include determining when the slot enters the transition zone based on a marker associated with the first line of the passage.

The operations can further include increasing the velocity of at least one of the slot's lead and trail edges in accordance with the transition velocity profile such that a length dimension increases between the slot's lead and trail edges.

The operations can further include adjusting the velocity of the slot's lead and trail edges at different times.

The operations can further include decreasing the velocity of at least one of the slot's lead and trail edges in accordance with a digital recovery velocity profile when the slot exits the transition zone.

The operations can further include decreasing the velocity of at least one of the slot's lead and trail edges in accordance with the transition velocity profile such that a length dimension decreases between the slot's lead and trail edges, until the length dimension reaches a predetermined dimension.

The operations can further include determining when the slot exits the transition zone based on a marker associated with the second line of the passage.

The operations can further include adjusting at least one of the slot's position or advancement based on a code related to the passage, wherein the code is embedded in the passage or is associated with the passage.

The operations can further include receiving a request to adjust one of a position of the slot, the velocity of the slot, and a velocity of at least one of a lead edge and trail edge of the slot. The operations can further include adjusting at least one of the slot position, the velocity of the slot, and the velocity of at least one of the lead edge and trail edge of the slot.

The operations can further include receiving feedback information from the user in response to the request to adjust. The operations can further include adjusting, based on the feedback information, at least one of: a selected distance for the position of the slot, an amount for velocity of the slot, and an amount for the velocity of the at least one of the lead edge and trail edge of the slot.

In accordance with a still further embodiment aspect, a computer-readable medium storing instructions is disclosed that, when executed by the processor, cause the processor to perform operations to control a reading slot to provide aid to a user in reading a passage. The operations include generating a mask having an opaque portion and a reading slot. The opaque portion covers a plurality of lines having characters that are visible through the slot. The plurality of lines includes at least a first line and a second line. The operations further include advancing the slot at a midline velocity in relation to the first line of the passage, and increasing the velocity of the slot in accordance with a digital transition velocity profile when the slot enters a transition zone of the passage.

The operations can further include displaying the mask over the plurality of lines.

The operations can further include accessing a reading proficiency of the user.

The operations can further include determining an opacity level of the mask based on the reading proficiency of the user.

The operations can further include determining the midline velocity based on the reading proficiency of the user.

The operations can further include determining a length dimension of the slot based on the reading proficiency of the user.

The slot can include a translucent portion and a semi-opaque portion. The operations can further include setting at least one of a length dimension of the semi-opaque portion and a degree of opaqueness of the semi-opaque portion based on the reading proficiency of the user.

The operations can further include determining when the slot enters the transition zone based on a marker associated with the first line of the passage.

The operations can further include increasing the velocity of at least one of the slot's lead and trail edges in accordance with the transition velocity profile such that a length dimension increases between the slot's lead and trail edges.

The operations can further include adjusting the velocity of the slot's lead and trail edges at different times.

The operations can further include decreasing the velocity of at least one of the slot's lead and trail edges in accordance with a digital recovery velocity profile when the slot exits the transition zone.

The operations can further include decreasing the velocity of at least one of the slot's lead and trail edges in accordance with the transition velocity profile such that a length dimension decreases between the slot's lead and trail edges, until the length dimension reaches a predetermined threshold.

The operations can further include determining when the slot exits the transition zone based on a marker associated with the second line of the passage.

The operations can further include adjusting at least one of the slot's position or advancement based on a code related to the passage, wherein the code is embedded in the passage or is associated with the passage.

The operations can further include receiving a request to adjust one of a position of the slot, the velocity of the slot, and a velocity of at least one of a lead edge or trail edge of the slot. The operations can further include adjusting at least one of the slot position, the velocity of the slot, and the velocity of at least one of the lead edge and trail edge of the slot.

The operations can further include receiving feedback information from the user in response to the request to adjust. The operations can further include adjusting, based on the feedback information, at least one of: a selected distance for the position of the slot, an amount for velocity of the slot, and an amount for the velocity of the at least one of the lead edge and trail edge of the slot.

These and other purposes, goals and advantages of the present application will become apparent from the following detailed description read in connection with the accompanying drawings.

BRIEF DESCRIPTION OF THE DRAWINGS

Some embodiments or aspects are illustrated by way of example and not limitation in the figures of the accompanying drawings in which.

DETAILED DESCRIPTION

A system and method to control advancement of a reading slot of a computerized reading aid are disclosed herein. In the following description, for the purposes of explanation, numerous specific details are set forth in order to provide a thorough understanding of example embodiments or aspects. It will be evident, however, to one skilled in the art, that an example embodiment may be practiced without all of the disclosed specific details.

The computerized reading aid provides a mask that overlays a reading passage having a plurality of characters. The mask includes an opaque portion that occludes some of the characters of the reading passage, and a transparent slot through which other characters of the reading passage are visible. The slot is advanced in relation to, e.g., along, a line of characters. The velocity at which the slot advances and the length of the slot can vary. The velocity at which the slot is advanced can be increased when the slot reaches the end of the line and transitions to a next line. Additionally, the length of the slot can be increased when the slot reaches the end of the line and transitions to a next line.

More specifically, the slot is advanced along a line of characters at a midline velocity until it encounters (e.g., enters) a transition zone when it begins to transition from a first line to a second line. When the slot enters the transition zone on the first line, the velocity of at least one of the slot's lead and trail edges can be increased. The timing and velocity changes during the transition can be determined from a digital transition velocity profile. When the slot exits the transition zone on the second line (e.g., an edge of the slot encounters an end of the transition zone), the velocity of at least one of its lead and trail edges can be changed so that the slot can resume advancing at its midline velocity and return to its midline length. The timing and velocity changes during the recovery from transition velocity to midline velocity can be determined from a digital recovery velocity profile.

Parameters of the mask can be selected in accordance with an assessment of the proficiency of the reader. Selectable parameters can include dimensions of the mask, a length dimension of the slot (e.g., the distance between a trail edge and a lead edge of the slot), the slot's midline velocity, the slot's velocity transition profile, the slot's recovery profile, and the location of markers that define the transition zone.

Figure 1:
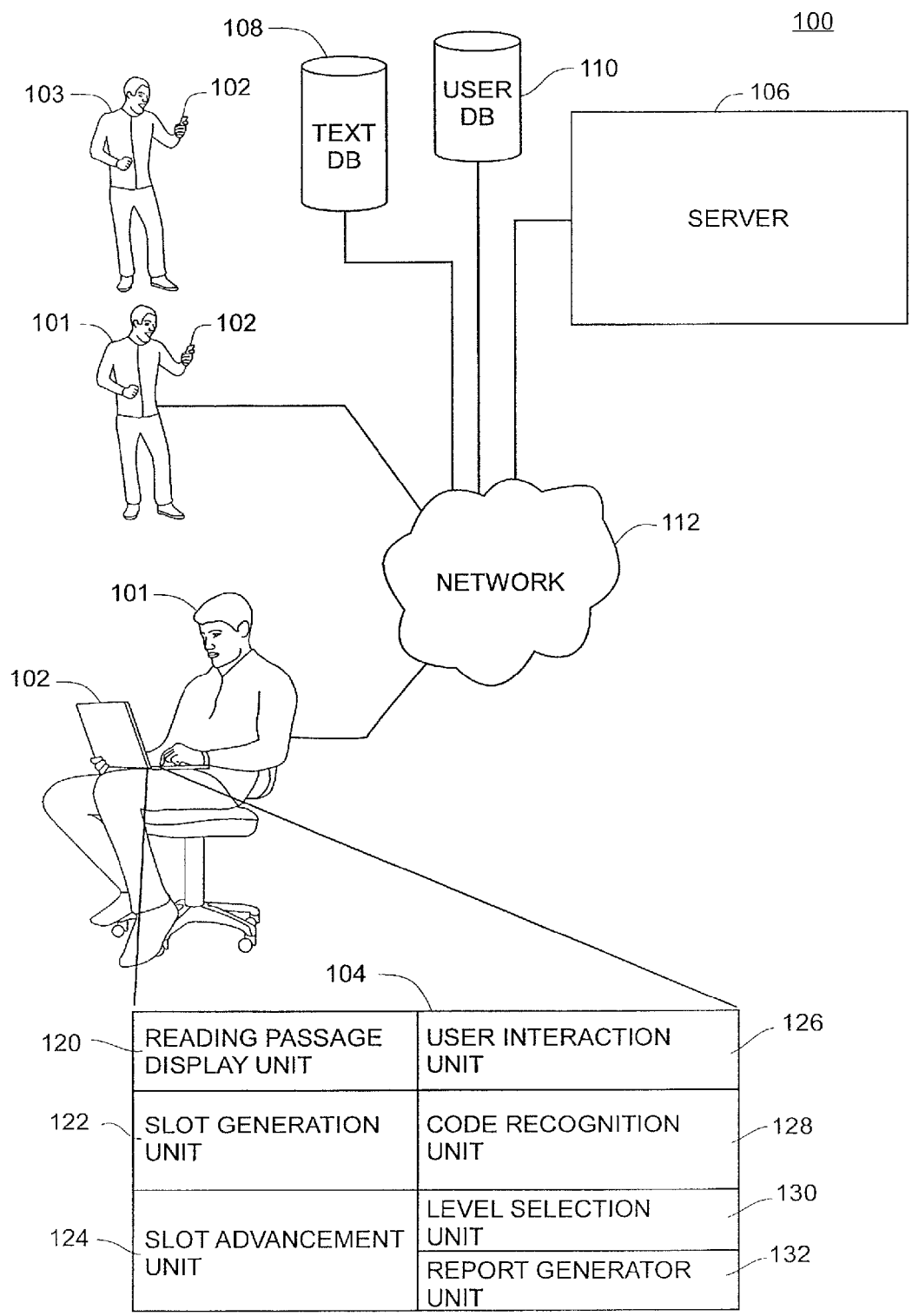
FIG. 1 illustrates an example reading aid system having an advancing reading slot.

FIG. 1 illustrates an example reading aid system 100. The example system 100 includes at least one computing device 102 that can be operated by a user. A user can be an administrator 101 (e.g., a teacher, principal, or network administrator) or a reader 103 (e.g., a student). An administrator can, for example, use the computing device 102 to configure the computing device 102, to configure a profile for a reader 103 or to retrieve results about one or more readers 103. A reader 103 can, for example, use the computing device 102 as a reading aid to train while reading a passage using the mask and advancing reading slot.

In some embodiments, the system 100 can also include a server 106, a reading passage database 108, a user database 110, and communication network 112. The communication network 112 can enable communication among the computing devices 102, server 106, reading passage database 108, and/or user database 110.

The communication network 112 can include one or more of a long haul transport network (e.g., gigabit Ethernet network, Asynchronous Transfer Mode (ATM) network, frame relay network), wireless network (e.g., satellite network, Wi-Fi network, cellular network, or another wireless network), other public or private networks, or any combination thereof. The foregoing is not exhaustive and alternate or additional communication networks can be employed to interconnect the computing devices 102, server 106, reading passage database 108, and/or user database 110.

The communication network 112 can include one or more of a wide area network (WAN), local area network (LAN), virtual private network (VPN), peer-to-peer (P2P) network, as well as any other public or private network (e.g., the Internet), or any combination thereof. Other conventional or yet to be developed communications networks can form at least a part of the communication network 112. At least a portion of the transmission over the communication network 112 can be accomplished, for example, via Transfer Control Protocol/Internet Protocol (TCP/IP), User Datagram Protocol (UDP)/IP, or any combination of conventional protocols or yet to be developed protocols. The computing devices 102 can communicate with other systems and devices illustrated in FIG. 1, whether directly and/or using one or more networks, such as network 112.

The computing device 102 can be a personal computer (e.g., desktop or laptop), tablet computing device, a smart phone, a smart device, or a computer terminal of a network of computing devices, etc. The computing device 102 can operate as a standalone device that can operate without communicating with the network 112. Alternatively, the computing device 102 can communicate with other devices via the communication network 112, such as other computing devices 102, the server 106, the reading passage database 108, and/or the user database 110. The computing device 102 can store and execute a web browser for accessing and exchanging information with server 106 and other devices via the communication network 112.

The computing device 102 includes and/or accesses at least one storage device and a processor that performs operations in accordance with execution of instructions provided by reading aid ("aid") unit 104. The computing device 102 has a display device that can present a graphical user interface (GUI) to display one or more reading passages for training the user to read with better fluency at a greater speed. The GUI displays information to the user and can be used to input information to the computing device 102. Information can be input using a one or more devices of the computing device 102, such as a touch screen, a cursor control device (e.g., a mouse, touchpad, or joystick), a keypad, and/or keyboard.

The reading aid unit 104 includes a reading passage display unit 120, a slot generation unit 122, a slot advancement unit 124, a user interaction unit 126, a code recognition unit 128, a level selection unit 130, and a report generator unit 132.

In some embodiments, the reading aid unit 104 is stored and executed locally by a computing device 102 that displays a mask with reading slot in relation to (e.g., over) a selected reading passage. The term "locally," as used herein, refers to an act that is performed by a component that is integrated with the computing device 102 or server 106. The term "integrated," as used herein, refers to being included within, inserted into (e.g., via a port), or otherwise physically associated with the referenced device. Accordingly, all or a portion of the reading aid unit 104 can be executed and performed locally by the computing device 102. In another embodiment, the reading aid unit 104, or a portion of the reading aid unit 104, is stored, provided, and executed remotely by the server 106. The term "remotely," as used herein, refers to being connected to a device by a wired and/or wireless connection, e.g., a cable or a network. Thus, all or a portion of the reading aid unit 104 can be executed and performed remotely by the server 106. For example, the server 106 can generate the mask and control advancement of the slot during a reading session, while the mask and the slot are displayed over a reading passage displayed by the computing device 102.

One or more of the units 120-132 of reading aid unit 104 can be transmitted via communication 112 from the server 106 to the computing device 102, e.g., for the computing device 102 to store and execute locally. Additionally, reading aid unit 104 can be configured as an "app" that is downloaded and stored by tablets, smart devices, phones, and the like. The units 120-132 of reading aid unit 104 are described in greater detail below.

The server 106 can be a computer such as a network server or a web server that processes requests and delivers data to other computing devices 102, e.g., in accordance with a server/client relationship via communication network 112. Moreover, server 106 can communicate with the browsers of the computing devices 102, e.g., to send one or more web pages to a requesting computing device 102, and to exchange information via the webpages. As a web server, server 106 can further communicate with the web browser and reading aid unit 104 of one or more of the computing devices 102 using one or more communication protocols, such as Hyper Text Transfer Protocol (HTTP).

The server 106 can transmit display information to the computing device 102 for generating or providing information to the GUI for display by the computing device 102. Additionally or alternatively, the server 106 can receive information input from the user via the GUI. The GUI used to exchange information between the computing device 102 and the server 106 can include one or more webpages.

The reading passage database 108 and user database 110 can include one or more databases stored on one or more storage devices that can be integrated with or be remote from the computing device 102 or the server 106. The reading passage database 108 stores reading material including a plurality of reading passages having text that can be displayed on the display device of the computing device 102. The reading passage database 108 or portions thereof can be stored locally by a computing device 102, by a network (e.g., an intranet) of computing devices 102, and/or by server 106.

The reading passages can include additional components, such as images, graphics, symbols, tables, embedded codes, etc. The text in a reading passage can precede, follow, overlay, underlie, or wrap around the additional components. The text in the passage can include readable characters, such as alphanumeric characters (e.g., including the "space" character), kana or kanji, mathematical operators, symbols, emoticons, and/or other characters that are readable, e.g., associated with a predefined meaning alone or in combination with other characters. A reading passage can be selected, automatically or by a user, from a plurality of passages and retrieved from the reading passage database 108, such as based on information associated with the reading passage (e.g., reading difficulty level, genre, subject area, title, searchable word or phrase, and/or author). The plurality of passages from which a user is allowed to select a reading passage can be limited based on the user's profile (e.g., which can include the user's grade level, teacher, class, favorite subject areas, etc.).

The text in a passage can be formed in lines that have a beginning and an end. The lines can be oriented horizontally or vertically, and the text in the passage can be read left-to-right, right-to-left, top-to-bottom, or bottom-to-top. In the examples that follow, the text is set forth in lines, left-to-right, for conciseness and clarity. The text in the passage can be formatted, for example, in paragraphs, columns (e.g., a newspaper or magazine article), tables, charts, with one or more margins that vary within the passage. The length of different lines in the passage can vary.

The user database 110 stores information relating to users of the reading aid unit 104. The user database 110 can include a list of users who use reading aid unit 104, and associated user profiles. The user profiles can indicate a group or subgroup that a user is associated with, such as a school district, town, school, grade, classroom, etc. Access to information about the users can be limited by requiring entry of authorization data, such as a username and passcode. The user database 110 or portions thereof can be stored locally by a computing device 102, by a network (e.g., an intranet) of computing devices 102, and/or by server 106.

Information stored about a reader can include reading proficiency assessment information; previously generated reports associated with use of the reading aid unit 104; reading preferences, such as favorite subjects for reading material; and reading proficiency goals.

The units 120-132 of reading aid unit 104 are now described. Reading passage display unit 120 enables a user to select a reading passage from the reading passage database 108 and displays the selected reading passage in a GUI of the computing device 102. Slot generation unit 122 generates a mask and a slot according to one or more parameters, and displays the mask and slot in the GUI by overlaying the mask and slot in relation to (e.g., over) the reading passage. The mask includes one or more opaque portions and a slot portion (e.g., slot). The opaque portion of the mask obscures one or more reading portions underneath that are not visible or are partially visible. Portions of the reading passage under partially translucent portions of the mask have reduced visibility that can be varied based on a degree of opaqueness, e.g., an opaqueness percentage. The clarity of the visibility is decreased with higher percentage of opaqueness. The slot of the mask allows a reading portion under the mask to be visible through the slot, which is a translucent portion of the mask.

The mask parameters can be determined based on reading proficiency assessment information stored for the reader. The mask parameters can also be determined based on characteristics of the reading passage, such as a font size of the characters and reading difficulty level of the selected reading passage. In some embodiments, one or more of the mask parameters can be selected by an administrator having administrative privileges. Mask parameters can also be adjusted based on user feedback information.

Slot advancement unit 124 controls advancement of the slot in relation to (e.g., along) the displayed lines of text of the passage, including controlling transition of the slot from one line of text in a passage to a next line of text in the passage. User interaction unit 126 interacts with the reader before, during, and/or after a reading session to exchange information between the user and reading aid unit 104 about a reading session. The user interaction unit 126 receives information input by a user via a user control tool (e.g., user control panel 504 in FIG. 5) associated with the GUI displaying a masked reading passage. The user interaction unit 126 can further request and/or receive feedback information from the user during or after a reading session, such as via a pop-up window. Additionally, the user interaction unit 126 can generate feedback information reporting the reader's performance during the reading session and use of the user control tool 504. The advancement of the slot as controlled by the advancement unit 124 can be adjusted in response to the feedback information.

Code recognition unit 128 recognizes codes that are included in (e.g., embedded) or otherwise related to the reading passage. It uses information provided by the codes to control one or more aspects of the reading session, such as the mask parameters. Level selection unit 130 selects a student's reading proficiency level based on the student's performance during reading sessions using the reading aid unit 104, information input by a user (e.g., a teacher), reading assessment results, and results generated by user interaction unit 126. Report generator unit 132 generates reports about readers and their performance using the reading aid unit 104. Reports can be generated for groups of readers, such as grouped by classroom, teacher, school grade, school, school district, gender, socio-economic level, etc.

Figure 2A:
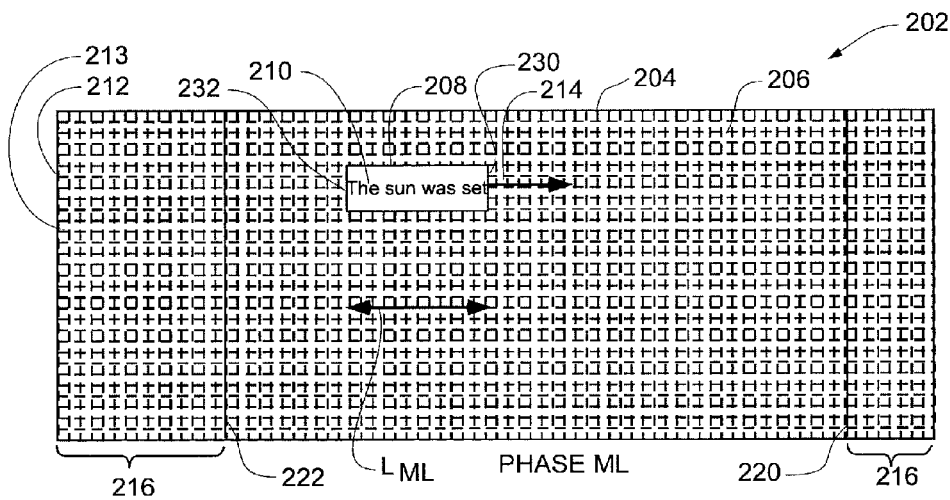
FIGS. 2A-2E illustrate an example mask with a reading slot displayed in relations to a reading passage.

FIG. 2A shows a window 202 of a GUI (e.g., GUI 500 shown in FIG. 5) in which a selected reading passage is displayed. A mask 204 is generated and displayed in relation to (e.g., over) the selected reading passage in a direction 214. The mask 204 overlays the reading passage so that the reading passage is underneath the mask. The mask 204 has an opaque section 206 and a reading slot 208 through which characters 210 included in the reading passage are visible. The slot 208 is shown in a first position. During a reading session, the slot 208 is advanced in relation to (e.g., along) a plurality of lines of the reading passage, e.g., sequentially. The direction 214 can vary based on language. The velocity at which the slot 208 is advanced depends upon the position of the slot 208 on the line it is positioned on (referred to as "the current line"). For example, the velocity at which the slot 208 is advanced can be increased or decreased based on a position of the slot 208 on one or more of the lines relative to one or more markers.

Each marker can be generated based on a distance or time measurement. The distance can be measured, for example, by the number of characters or words, or by units, such as, inches, centimeters, pixels, points, pica, or another measurement. The distance can be measured, for example, relative to a beginning or end position of one of the lines of the reading passage, a first or last character of the line, or another marker. Time can be measured by units, such as seconds. The time can be measured, for example, relative to a time that the reading session began or relative to an expected time to advance to another position in the reading passage or marker using a selected velocity (e.g., the slot's current velocity) or another measurement.

In an embodiment, velocity of the slot 208 is increased or decreased based on the slot's position relative to a transition zone 216. A first marker 220 marks the beginning of the transition zone 216, and a second marker 222 marks the end of the transition zone 216. The slot 208 advances in direction 214 through the transition zone 216 when it transitions from one of the lines of the reading passage (e.g., a first or current line 212) to another of the lines of the reading passage (e.g., a second or next line 213).

The slot 208 has a lead edge 230 and a trail edge 232. The slot 208 has a length, which is a distance between the lead edge 230 and the trail edge 232. The slot 208 is shown advancing during a midline (ML) phase before it enters the transition zone 216 (see FIG. 4, ML phase 410). During the ML phase, the slot 208 advances at a midline velocity $V_{ML}$, and has a midline length $L_{ML}$. Midline refers to the middle of a line, e.g., not the transition zone 216 associated with the line. The ML phase can also include the beginning of a line that falls within the transition zone 216, such as at the beginning of the reading passage when the slot 208 first begins advancing and is not transitioning among lines.

The reading aid unit 104 can help the reader to improve reading speed and fluency when transitioning from a first line of text in a passage (in the current example, line 212) to a second line of text in the passage (in the current example, line 213) by increasing the velocity of the slot 208 when it advances in relation to the transition zone 216 associated with the first and second lines 212, 213. In one embodiment, the velocity is increased in accordance with a transition velocity profile. In order for the slot 208 to return to advancing at its midline velocity $V_{ML}$, the velocity of the slot 208 is changed in accordance with a recovery velocity profile.

In an embodiment, the velocities of the lead edge 230 and trail edge 232 are increased and/or decreased at the same time and by the same magnitude. As a result, the length of the slot 208 does not change during transition among lines, e.g., as the slot 208 advances in relation to transition zones.

In another embodiment, the velocities of the lead edge 230 and trail edge 232 are increased or decreased at different times and/or by different magnitudes in accordance with the transition velocity profile or the recovery velocity profile. As a result, the length of the slot 208 changes while the slot 208 advances in relation to the transition zone 216.

The respective parameters of the mask 204 can be predetermined, selectable by an administrator 101 accessing an reading aid unit 104 of a computing device 102, selectable by a reader 103 using the computing device 102, selectable automatically in accordance with results of an assessment of the reader's proficiency (e.g., reading rate and span of recognition at the reading rate), selectable by performance, adjusted in response to feedback information associated with the current or previous reading sessions, and/or determined based on the setting of one or more other mask parameters. A list and description of example mask parameters is provided as follows.

The dimensions of the mask 204 are parameters that can be defined in accordance with the dimensions of the window 202 and/or the layout or format of the text of the reading passage displayed in the window 202.

The margins of the mask 204 and margins that define the beginning and end of the plurality of lines can be selected by an administrator 101 or determined automatically from the reading passage, e.g., according to predefined margins associated with the reading passage. For example, the margins or layout of the reading passage can be accessed and used to determine the margins of the mask or layout of the plurality of lines of text in the passage that the slot will advance along. The margins and layout can also be determined based on information included in embedded codes included in the reading passage.

$L_{ML}$ is the slot's 208 midline length. This is the distance between the lead edge 230 and the trail edge 232 when the slot 208 is not transitioning between lines. $L_{ML}$ is measured by units that can be predetermined or selectable. The units can be, for example, inches, centimeters, pixels, points (1/72.272 inch), pica (pc) (⅙th of an inch), or another unit. $L_{ML}$ can alternatively be measured by the number of characters or the number of words between the lead edge 230 and the trail edge 232.

$L_{ML}$ can be defined, for example, based on the reading proficiency of the reader, and particularly the reader's average span of recognition at the midline velocity $V_{ML}$ of the slot 208. In one example, $L_{ML}$ is selected so that at least 7-8 characters are exposed within the slot 208, which accommodates the average span of recognition of most readers. Information about the reader's span of recognition can be included with result data obtained from assessments administered to the reader that assess the reader's reading proficiency and span of recognition. Since the reader's span of recognition can vary with different reading speeds, the $L_{ML}$ of the slot 208 can be selected to be longer in accordance with a higher selected $V_{ML}$, and shorter when the $V_{ML}$ is selected to be lower. By providing a suitable $L_{ML}$ for the reader based on the reader's reading proficiency and the $V_{ML}$, the reader can have effective visual contact with words exposed on each line through the slot 208 without exposure to too many words. Exposure to too many words can encourage a saccade, e.g., in the direction of advancement that is too far ahead. Such a saccade can result in the reader missing words, or excessive regressions in which the reader returns focus to text in the passage that the reader missed due to a saccade that was too far in advance.

The first marker 220 is a marker that marks the beginning of the transition zone 216 for a plurality of lines of a reading passage. The transition zone 216 includes the end portion of a line, e.g., first line 212, and the beginning portion of the next line, e.g., second line 213, to transition the reading slot 208 from line to line. The first marker 220 can be different for each of the plurality of lines, since the length of text on a line can vary. For example, the length of text on the last line of a paragraph may be shorter than for a line in the middle of the paragraph. The first marker 220 can be positioned in terms of distance, e.g., a distance from a margin, the end of a line (e.g., the last character or word of text on the line), or from the second marker 222. The distance can be measured, for example, by the number of characters or words, or by units, such as, inches, centimeters, pixels, points, or pica. Alternatively, the first marker 220 can be measured in terms of time, e.g., as a time interval (e.g., measured in seconds) before slot 208 encounters a margin, the end of the text on a line (e.g., the last character or word of text on the line), or the second marker 222, (e.g., determined using $V_{ML}$ or a different selected velocity).

The term "encounter," as used herein with reference to the slot 208 encountering an entity associated with the reading passage or the mask, such as a margin or a marker, refers to a determination that the position of the slot 208 (e.g., its lead edge 230, trail edge 232, midpoint) has a predetermined relation relative to the position of the entity. The predetermined relation can include, for example, having the same position, such as when the slot 208 (or its lead edge 230) reaches the entity. In another example, the predetermined relation can include having a position a predetermined distance (e.g., measured as by the number of pixels, points, or pica, characters or words, or by units, such as, inches, centimeters) in a predetermined direction relative to the entity, such as when the slot passes the entity.

The second marker 222 is a marker of the end of the transition zone 216 for the plurality of lines of the reading passage, which is when the reading slot 208 recovers from transitioning to a next line, e.g., second line 213. The second marker 222 can be different for each of the plurality of lines, since the length of a line of text in a passage can vary, such as for the first line of a paragraph in which the text is indented. The second marker 222 can be positioned in terms of distance, e.g., a distance from a margin, the first character or word of text on the line, or the distance from the first marker 220. The distance can be measured, for example, by the number of characters or words, or by units, such as, inches, centimeters, pixels, points, or pica. Alternatively, the second marker 222 can be measured in terms of time, e.g., as a time interval (e.g., measured in seconds) after slot 208 encounters a margin, the beginning of the text on a line (e.g., the first character or word of text on the line), or the second marker 222 (e.g., determined using $V_{ML}$ or a different selected velocity).

$L_{TZ}$ is the length of the transition zone 216, which is the distance between the first marker 220 and the second marker 222. Of the three parameters, the first marker 220, the second marker 222, and $L_{TZ}$, two of these parameters can be selected or determined, which can cause determination of the third parameter.

The first marker 220, the second marker 222, and/or $L_{TZ}$ can be selected or determined based on the reader's reading proficiency, the $V_{ML}$, and/or the velocities of the lead and trail edges 230 and 232 during transition or recovery. For example, $L_{TZ}$ can be selected to be longer for an experienced reader that reads at a faster rate than a slower reader. A longer $L_{TZ}$ provides the advantage of exposing more characters that lie in the reader's advance peripheral vision during a transition from line to line of a reading passage. However, for a slower reader, an $L_{TZ}$ that is too long can cause a distraction or encourage saccades that interfere with reading fluency.

$V_{ML}$ is the slot's 208 midline velocity when the slot 208 is not transitioning between lines. $V_{ML}$ is measured by a ratio of distance (e.g., inches, centimeters, pixels, points, pica, or number of characters or words) and time unit (e.g., seconds).

$P_{VT}$ is the slot's 208 velocity transition profile. $P_{VT}$ describes the timing and changes in velocity of the lead edge 230 and trail edge 232 of the slot 208 from the time the lead edge 230 enters the transition zone 216 on line 212 until the lead edge 230 exits the transition zone 216 on line 213.

Entering the transition zone 216, as used herein, refers to encountering the transition zone 216. In an embodiment, the slot 208 encounters the transition zone 216 when its lead edge 230 encounters the beginning of the transition zone 216, e.g., the first marker 220. Exiting the transition zone 216 herein refers to a termination of the encounter with the transition zone 216. In an embodiment, the slot terminates its encounter with the transition zone 216 when its lead edge 230 encounters the end of the transition zone 216, e.g., the second marker 222.

$P_{VT}$ is selected so that when the lead edge 230 encounters the first marker 220, the velocity of the slot's lead edge 230 and trail edge 232 are increased (e.g., to $>V_{ML}$, either together or one at a time), as the slot 208 transitions to line 213. In this way, the reader is trained to increase his/her reading rate when transitioning from one line to the next line. The timing when to change the velocity, and the amount by which the velocity is changed, are each selectable, e.g., by a user or automatically, such as in accordance with the user's profile or characteristics of the reading passage.

In one embodiment, the lead edge 230 and trail edge 232 increase at the same time and by the same amount so that the length of the slot 208 $L_{ML}$ remains constant as the slot 208 advances in relation to line 212, transitions to the next line 213, and continues to advance along line 213.

In one embodiment, the trail edge 232 increases its velocity before the lead edge 230 does, in order to cue the reader to move his/her focus more quickly to the next line.

In another embodiment, the velocity of the lead edge 230 is increased during transition to the next line 213 without increasing the velocity of trail edge 232. This configuration causes the length of the slot to increase so that it is greater than $L_{ML}$.

In still another embodiment, the velocity of both the lead edge 230 and the trail edge 232 are increased, but the velocity of lead edge 230 is increased by a greater amount than the velocity of trail edge 232.

The increases in velocity can be, for example, performed in incremental steps, continual, or in a single step. $P_{VT}$ is described in greater detail below with reference to FIG. 4.

$P_{VR}$ is the slot's 208 velocity recovery profile. $P_{VR}$ describes the timing and changes in velocity of the lead edge 230 and trail edge 232 during a recovery phase after the slot 208 transitions from one line to the next line.

$P_{VR}$ is selected so that when the lead edge 230 exits the transition zone 216 on the second line 213, the velocities of the slot's lead edge 230 and trail edge 232 are decreased (e.g., until they equal $V_{ML}$) as the slot 208 continues to advance in relation to the second line 213. Depending on the embodiment described above, the velocities can be decreased by same or different amounts. In this way, the reader resumes reading at the reader's midline reading velocity. The timing when to change the velocity, and the amount by which the velocity is changed, are selectable, e.g., by a user or automatically, such as in accordance with the user's profile or characteristics of the reading passage.

In one embodiment, the velocities of the lead edge 230 and trail edge 232 decrease at the same time and by the same amount, so that the length of $L_{ML}$ the slot 208 remains constant as the slot 208 continues to advance along the second line 213.

In another embodiment, the lead edge 230 decreases its velocity to $V_{ML}$. The velocity of the trail edge 232 continues at its increased velocity (e.g., per the velocity transition profile $P_{VT}$), until the length of the slot 208 returns to the midline length $L_{ML}$. At that point, the velocity of the trail edge 232 decreases to $V_{ML}$.

In another embodiment, the lead edge 230 decreases its velocity to $V_{ML}$. The velocity of the trail edge 232 is increased to a velocity that is greater than its velocity during transition, until the length of the slot 208 returns to the midline length, $L_{ML}$. At that point, the velocity of the trail edge 232 decreases to $V_{ML}$.

In still another embodiment, the velocity of both the lead edge 230 and the trail edge 232 are decreased, but the velocity of lead edge 230 is decreased by a greater amount than the velocity of trail edge 232.

The increases and decreases in velocity can be, for example, performed in incremental steps, continual, or in a single step. $P_{VR}$ is described in greater detail below with reference to FIG. 4.

$O_M$ is the opacity of the mask 204. The opacity can be selectable, such as based on the reading proficiency of the reader. For example, $O_M$ can be selected to be 100% opaque so that the mask 204 fully obscures all text in the passage other than the text that is exposed through the reading slot 208. This opacity setting can be selected for a beginning reader or slow reader (e.g., having a reading rate of less than 360 wpm). This selection may be for the purpose of training the reader to advance his/her visual focus along sequential lines for encouraging sequential fixation. The reader thus can train to read the passage by repeatedly visually tracking the slot 208 as it advances, e.g., along a line 212 and transitions to the beginning of the next line in sequence.

Partial opacity of mask 204 (e.g., $O_M$=30%-70%) can be selected for readers having reading rates faster than 360 wpm, with a lower percentage of opacity used for faster readers. By providing less opacity, the words that are outside of the slot 208 but covered by the opaque portion 206 of the mask 204 are partially visible. Faster readers can use more of their advance peripheral vision to read text in the passage that is ahead of the advancing slot 208 (e.g., right peripheral vision when reading from left-to-right). An experienced reader can use advance peripheral vision to obtain orthographic information for anticipating upcoming words and a landing position for the reader's next visual fixation. However, such advance peripheral vision can be detrimental to a less experienced reader, causing a distraction and encouraging saccades that interfere with fluency and speed in reading.

Figure 2B:
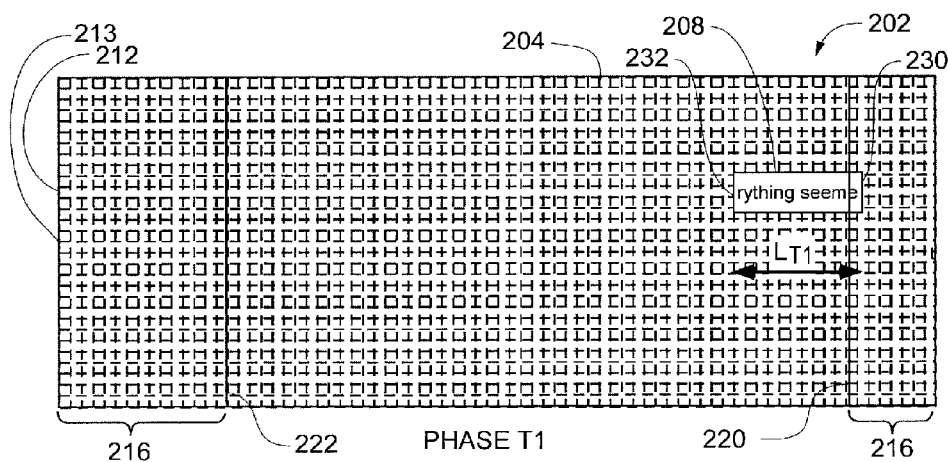

FIG. 2B shows slot 208 at a second position, in phase T1 (see FIG. 4, phase T1 416), in which the lead edge 230 has just encountered the first marker 220. This indicates that the slot 208 has entered the transition zone 216 and is beginning a transition operation to transition from line 212 to the next line 213. During phase T1, the slot 208 advances in accordance with the slot's 208 velocity transition profile $P_{VT}$. During phase T1 the velocity of the slot's trail edge 232 can be increased, cueing the reader that the transition operation is beginning. The length of slot 208 during phase T1 is $L_{T1}$, which is slightly shorter than $L_{ML}$.

Figure 2C:
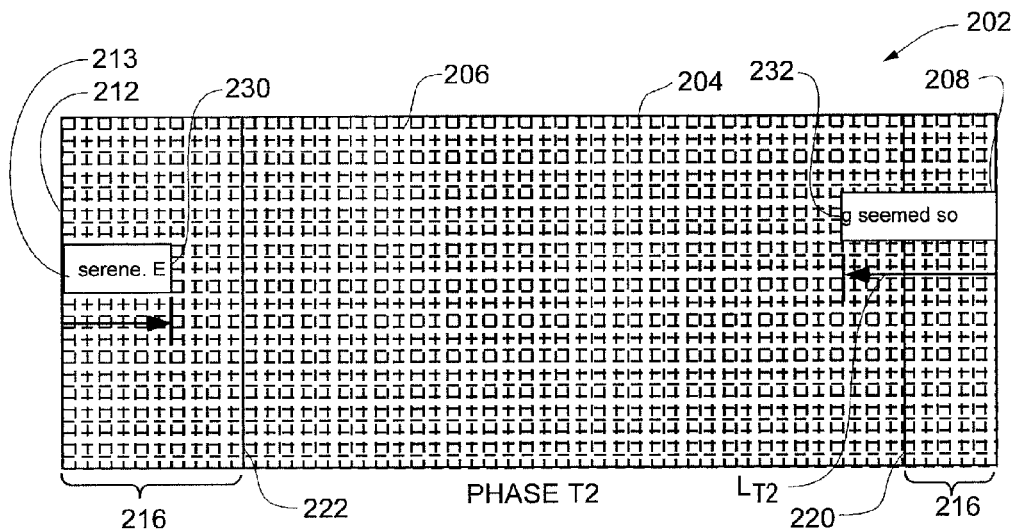

FIG. 2C shows slot 208 at a third position, in phase T2 (see FIG. 4, phase T2 418), in which the velocity of the lead edge 230 is increased, as the slot 208 continues to advance in accordance with the slot's 208 velocity transition profile $P_{VT}$. In the example shown, during phase T2, the velocity of the lead edge 230 exceeds the velocity of the trail edge 232, causing the length of the slot 208 to increase. The length of slot 208 during phase T2 is $L_{T2}$, which is longer than $L_{ML}$.

Figure 4:
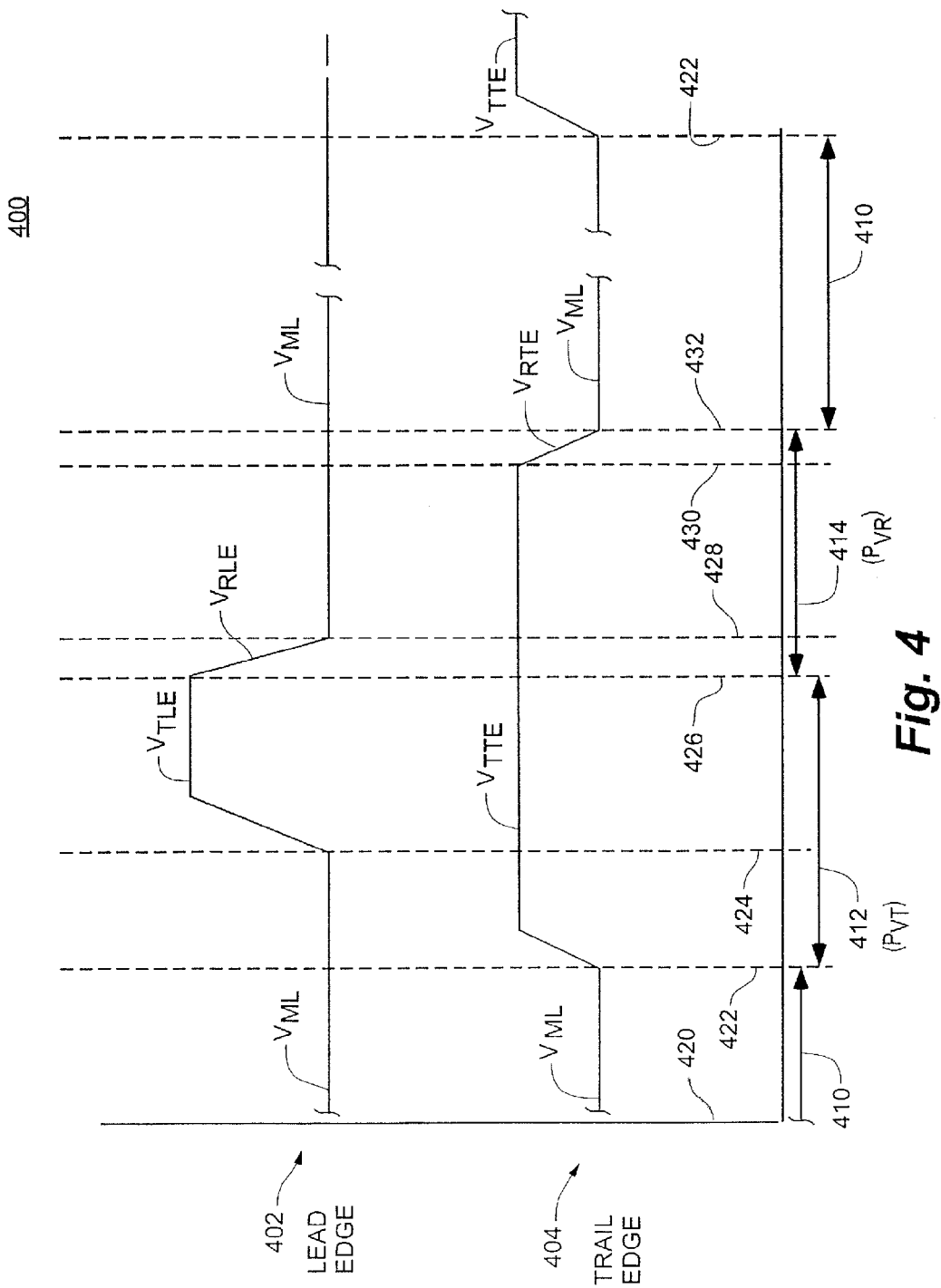
FIG. 4 illustrates velocity profiles of edges of the reading slot shown in FIG. 2A.

Phase T1 and T2 are both included in the transition phase T (see FIG. 4, phase T 412). The order and degree in which the lead edge 230 and trail edge 232 increase in velocity can be selected as described herein, among other possible alternatives.

Figure 2D:
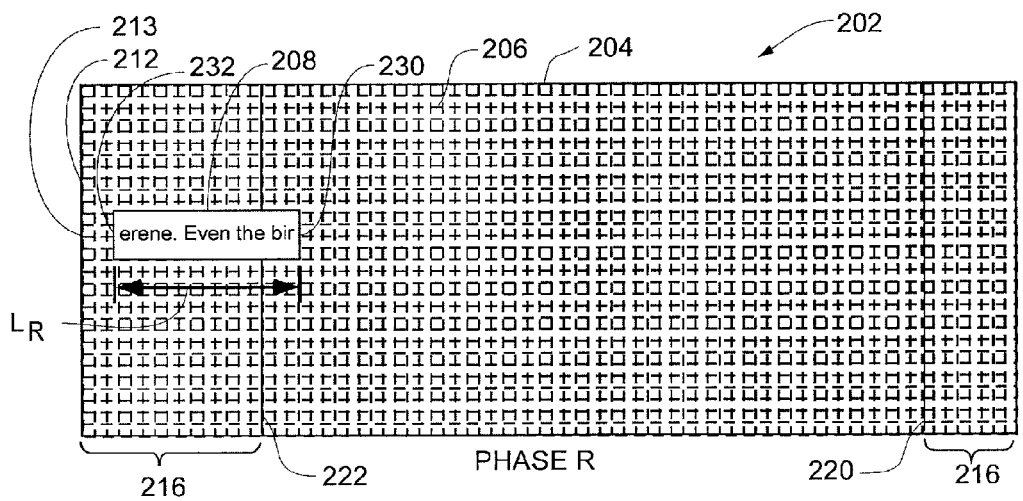

FIG. 2D shows slot 208 advancing at a fourth position, in recovery phase R (see FIG. 4, phase R 414), in which the lead edge 230 has just encountered the second marker 222. This indicates that the slot 208 is exiting the transition zone 216 and is completing the transition operation. During phase R, the slot 208 advances in accordance with the slot's 208 recovery transition profile $P_{VR}$. During phase R, the velocity of the slot's lead edge 230 is decreased to $V_{ML}$, while the trail edge 232 continues to advance at its increased velocity, causing the length of the slot 208 to decrease. The length of slot 208, shown as $L_R$, continues to decrease until it returns to $L_{ML}$.

In an embodiment, the velocity of slot's trail edge 232 can be increased during phase R, hastening the return of the slot's length to $L_{ML}$. The order and degree in which the lead edge 230 and trail edge 232 decrease or increase in velocity can be selected as described herein, among other possible alternatives.

Figure 2E:
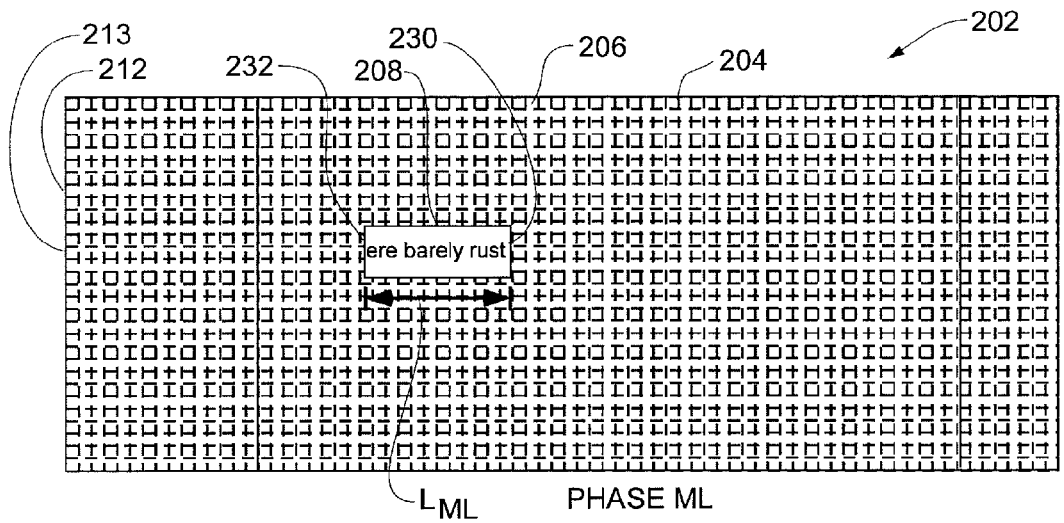

FIG. 2E shows slot 208 in connection with line 213 once the length of slot 208 has returned to $L_{ML}$ and the velocity of the lead edge 230 and trail edge 232 have both returned to the midline velocity $V_{ML}$. Advancement of the slot 208 has thus returned to phase ML on line 213.

Figure 3:
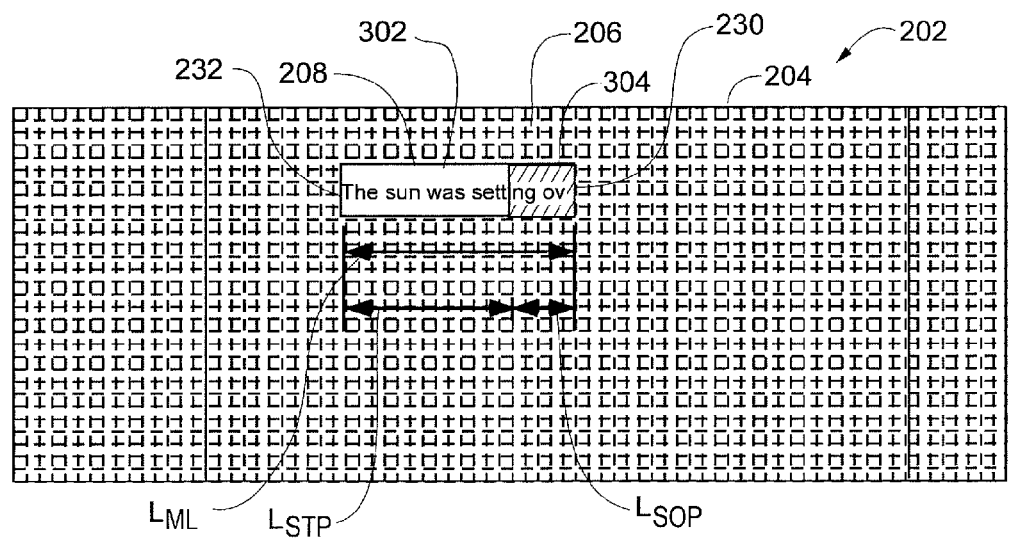
FIG. 3 illustrates another embodiment of the reading slot shown in FIG. 2A.

FIG. 3 shows slot 208 having a translucent portion 302 and an opaque portion 304. The length $L_{STP}$ of the slot's translucent portion 302, the length $L_{SOP}$ of the slot's opaque portion 304, and the opacity of the slot's opaque portion 304 can be selected. In this way, the amount of advance peripheral vision available to the reader can be controlled in terms of its length and visibility to the reader. In some embodiments, the slot 208 can have multiple opaque portions 304, each having a selectable length and opacity. These selections can be made in accordance with the reader's reading proficiency (e.g., reading rate and span of recognition at the reading rate) and/or the velocity of the slot 208, e.g., $V_{ML}$, $P_{VT}$, and $P_{VR}$.

FIG. 4 includes a timing diagram 400 during a transition operation from line to line that includes an example timing curve 402 of velocity profiles of the slot's lead edge 230 and an example timing curve 404 of velocity profiles of the slot's trail edge 232. The timing curves 402 and 404 show, for the lead edge 230 and the trail edge 232, respectively, the midline velocity during a midline phase 410 of a first (or current) line, the velocity transition profile $P_{VT}$ during a transition phase 412, and the velocity recovery profile $P_{VR}$ during a recovery phase 414, back to midline velocity during midline phase 410 of a second (or next) line.

The timing diagram begins during the midline phase 410 at time 420, during which the lead edge 230 and the trail edge 232 are both advancing along the first line 212 at the same midline velocity $V_{ML}$. At time 422, the lead edge 230 encounters the first marker 220 on the first line 212, and thus enters the transition zone 216, beginning the transition phase 412 of the transition operation.

During the transition phase 412, the lead edge 230 and trail edge 232 advance in accordance with the transition velocity profile $P_{VT}$. In the example shown, at time 422, the velocity of trail edge 232 increases in accordance with transition velocity $V_{TTE}$, causing the opaque portion 206 of mask 204 to quickly obscure the text at the first line 212. This prompts the reader to move his/her focus quickly to the beginning of the second (or next) line 213.

At time 424, the velocity of lead edge 230 increases in accordance with transition velocity $V_{TLE}$, wherein $V_{TLE} > V_{TTE}$. Since the lead edge 230 is advancing at a faster rate than the trail edge 232, the length of the slot 208 increases, exposing the beginning of the next line 213, encouraging the reader to rapidly continue reading on the next line 213. The lead edge 230 continues to increase its velocity in accordance with $V_{TLE}$ until it encounters the second marker 222 on the next line 213, and thus exits the transition zone 216, beginning the recovery phase 414 of the transition operation.

During the recovery phase 414, the lead edge 230 and trail edge 232 advance in accordance with the recovery velocity profile $P_{VR}$. In the example shown, at time 426, the velocity of lead edge 230 decreases in accordance with recovery velocity $V_{RLE}$, until it returns to its midline velocity $V_{ML}$, which occurs at time 428. During the recovery phase 414, trail edge 232 continues to advance at its increased transition velocity $V_{TTE}$, which is faster than the lead edge 230, causing the length of the slot 208 to decrease. The recovery phase 414 continues, with the length of the slot 208 decreasing, until the length of the slot 208 returns to approximately the midline length $L_{ML}$, which occurs at time 430.

At time 430, the velocity trail edge 232 is decreased in accordance with recovery velocity $V_{RTE}$ to its midline velocity $V_{ML}$. During the interval between time 430 and time 432 the length of the slot 208 decreases at a reduced rate relative to the time period between time 428 and time 430, until it reaches the midline length $L_{ML}$. Once the trail edge 232 has returned to its midline velocity $V_{ML}$ and the slot's length has returned to the midline length $L_{ML}$, which occurs at time 432, the recovery phase 414 is ended. Thus, at time 432, operation returns to the midline phase 410 on line 213 and both the lead edge 230 and the trail edge 232 advance at the midline velocity $V_{ML}$, with the slot's length maintained at $L_{ML}$. The midline phase 410 continues until the lead edge 230 encounters the first marker 220 on line 213, beginning another transition operation to advance to a next line.

Figure 5:
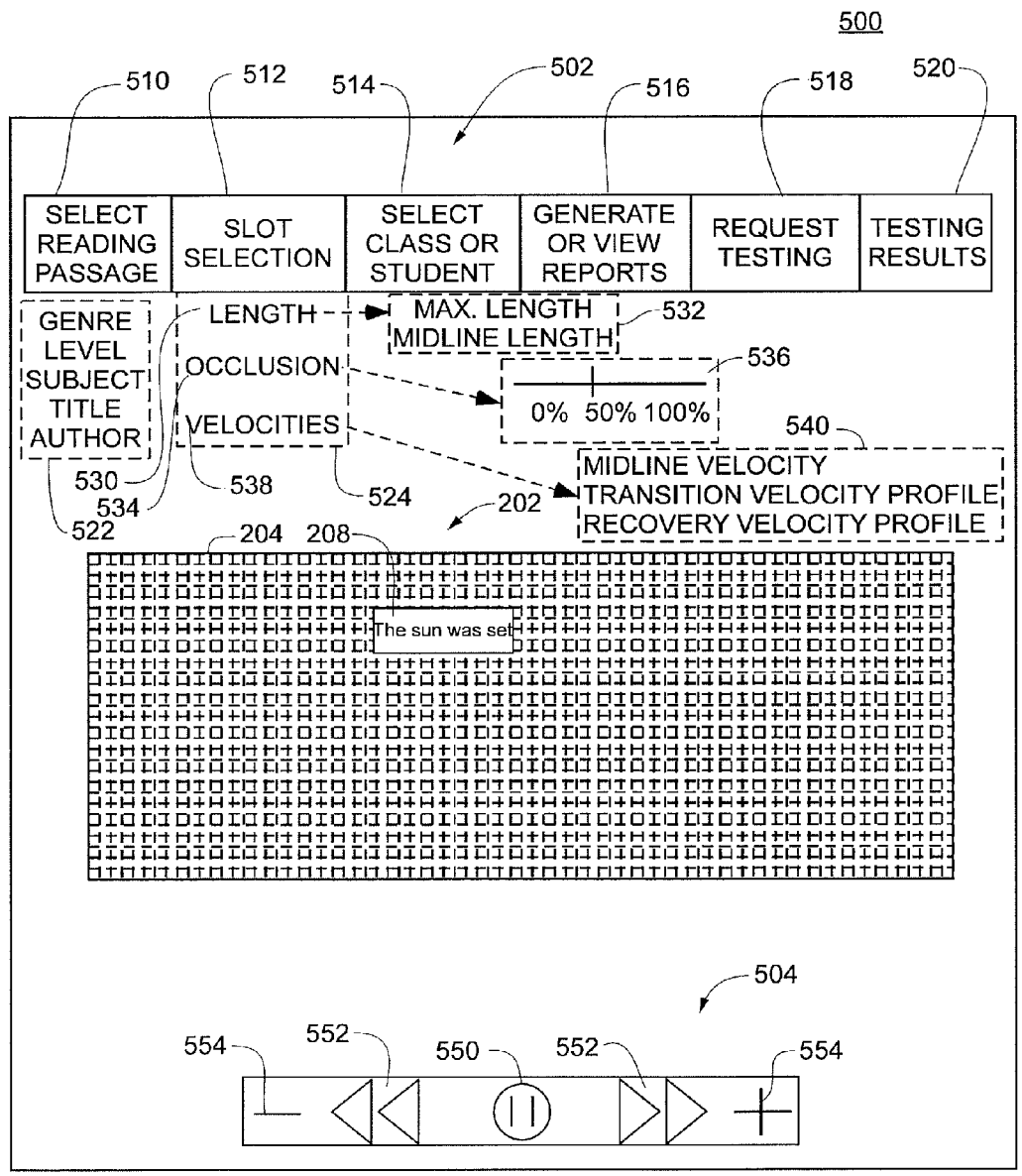
FIG. 5 illustrates a graphical user interface displayed by the reading aid system shown in FIG. 1.

FIG. 5 shows a GUI 500 displayed by reading aid unit 104 on a computing device 102 operated by a user. The user can be, for example, a reader, such as a student, teacher, or administrator. The teacher or administrator can administer use of the reading aid system 100 for one or more students.

The GUI 500 includes window 202 in which a reading passage is displayed with a mask 204 having an advancing slot 208 displayed over the reading passage. The GUI 500 further includes menu 502 and user control panel 504.

The menu 502 includes a plurality of menu entries, including, for example, Select Reading Passage 510, Level Selection 512, Select Class or Student 514, Generate or View Reports 516, Request Testing 518, and Testing Results 520. Activation of the menu entries 510-520 can provide the user with a selected function or a submenu which provides the user with additional entries. Some or all of the menu entries 510-520 and/or their submenus can be disabled, or provided with limited selection options, depending upon an authorization level of the user. The authorization level can be determined when the user accesses the reading aid unit 104, such as by a logon procedure. For example, a teacher can have access to information about his/her students and can select the reading passage and adjust levels for his/her students. A student may not have the authority to select a level, but can have access to a portion of the reading passages that fit certain criteria established by the teacher (such as the grade level of the reading passage).

Selection of the entry "Select Reading Passage" 510 can provide an example submenu 522, which allows the user to interact with reading passage display unit 120 of reading aid unit 104 to select a reading passage. The submenu 522 can present categories for the user to select from, including genre (e.g., reference, media articles, textbook, fiction, non-fiction, biography, or autobiography), level (e.g., grade level or difficulty level), subject (e.g., history, science, geography, business), title, or author. The teacher can choose to select the reading passage for his/her students, or provide a limited selection from which the students can select.

Selection of the entry "Slot Selection" 512 can provide submenu 524 that allows the user to interact with the slot generation unit 122 of reading aid unit 104. The user submenu 524 can present categories that the user can select from, including Length 530, Occlusion 534, and Velocities 538. Selection of the Length entry 530 can provide the user with a submenu 532 that allows the user to set the midline length of slot 208, or the maximum length that the slot 208 can reach during the transition phase 412. Selection of the Occlusion entry 534 can provide the user with an occlusion control tool 536 that permits the user to select the occlusion level of the mask 204. In another embodiment, the Occlusion entry 534 can allow the user to set occlusion levels of occlusion portion(s) 304. Selection of the Velocities entry 538 provides the user with a submenu 540 from which the user can choose to set the midline velocity $V_{ML}$ or characteristics of the velocity transition profile $P_{VT}$ or the velocity recovery profile $P_{VR}$ (such as the timings, $V_{TLE}$, $V_{TTE}$, $V_{RLE}$, and $V_{RTE}$).

Selection of the entry "Select Class or Student" 514 can provide a teacher or school administrator with a list of students or classes that he/she can select. Once a student or class is selected, the teacher or school administrator can designate mask parameters to be used for the selected student or class and/or a reading passage (or a truncated list of reading passages) that the student can choose from before starting a reading training session.

Selection of the entry "Generate or View Reports" 516 allows the user to interact with the report generator unit 132 of reading aid unit 104. For example, a teacher or school administrator can request a report about reading aid usage of a selected student, students in a selected class, or statistics, e.g., about students in a selected school, school district, state, etc. The report about a reading training session can include information obtained from the user interaction unit 126 of reading aid unit 104, such as qualitative or quantitative feedback information from the reader obtained during or after the reading training session, and a record of the reader's operation of the user controls 550-554 in FIG. 5 during a training session. The record of user control operation can include which user controls 550-554 were operated in the reading training session, or where relative to the reading passage the user controls 550-554 were operated. The feedback information can be obtained by the user interaction unit 126, e.g., by requesting feedback information from the user during or after the reading session.

During a reading training session, in which the selected reading passage is displayed in window 202, the reader can operate the user controls 550-554 to interact with the user interaction unit 126. The user controls 550-554 include a play/pause actuator 550, jump actuators 552, and velocity adjustment actuators 554. The play/pause actuator 550 can toggle between pausing advancing of the slot 208. The jump actuators 552 cause the slot 208 to jump a predetermined interval in the forward or backward direction (assuming left-to-right advancement), as indicated by the direction of the arrows displayed on selected jump actuator 552. The slot 208 can be caused to jump to the beginning or ending of a component of the reading passage, such as the word, line, paragraph, page, or reading passage that the slot 208 was positioned at when the jump actuator 552 was actuated. Alternatively, the predetermined interval can be measured in time or distance (e.g., inches, centimeters, pixels, points, pica, or number of characters or words).

Actuation of the velocity adjustment actuators 554 can cause the midline velocity $V_{ML}$ of the slot 208 to be adjusted by a predetermined amount, either by an increase or a decrease, as indicated by the symbol on the velocity adjustment actuator 554. In an embodiment, when the midline velocity $V_{ML}$ is adjusted, the transition and recovery velocity profiles $P_{VT}$, $P_{VR}$ can be, but do not have to be adjusted, e.g., proportionately, as compared to the adjustment of the midline velocity $V_{ML}$. In another embodiment, actuation of velocity adjustment actuator 554 can cause a velocity included in the transition or recovery velocity profiles $P_{VT}$, $P_{VR}$ to be adjusted. In this case, when one velocity is adjusted, one or more other velocities of the transition and recovery velocity profiles or the midline velocity $V_{ML}$ can be proportionately adjusted.

The user interaction unit 126 can record each instance of a user activation of the user controls 550-554, such as which of the user controls 550-554 were used, when in the reading training session (e.g., time relative to the start time that the session was initiated), or where in the reading passage the user controls 550-554 were used (e.g., which line and the distance from beginning of the line (e.g., inches, centimeters, pixels, points, pica, or number of characters or words)).

The user interaction unit 126 can request and store feedback information from the reader during or after the reading session. The feedback request can be in response to operation of any of the user controls 550-554. An example feedback request can include an open-ended question, qualitative question, questions that the reader can answer with a "yes" or "no," or questions to which the reader can provide a quantitative answer by user selection or input, e.g., feedback information, such as:

"Why did you pause the reading training session?" (e.g., in response to activation of the play/pause control 550 to effect a pause);

"Was the reading velocity too fast?" (e.g., in response to activation of jump actuator 552 in the backwards direction);

"Did you understand the text that you have read so far?" (e.g., in response to activation of the velocity adjustment actuator 554); and "On a scale of 1-10, please rate your comprehension of the reading passage. (Note: "10" indicates the highest level of comprehension.)" (e.g., upon encountering the end of a reading passage).

The feedback information can further include results of a reading comprehension assessment that can be administered by the reading aid unit 104, e.g., together with requesting feedback. For example, reading comprehension multiple choice questions and correct answers can be stored in the reading passage database and associated with the selected reading passage. The user interaction unit 126 can select an appropriate set of reading comprehension questions for the student (e.g., based on the student's grade level or previously assessed reading level), present the questions to the student, and assess the student's comprehension by comparing the user's answers to the correct answers. Alternatively, a reading comprehension test can be administered manually, and an assessment score (e.g., based on 100%) can be input by the teacher and stored with the student's feedback information. The feedback information received from the user in response to the feedback requests is stored and can be provided to the report generator unit 132. Additionally, the feedback information can be used to adjust the jump interval or the amount of a velocity adjustment.

Selection of the entry "Request Testing" 518 allows the user to request that the level determination unit 130 of reading aid unit 104 administer a reading assessment for a student. The reading assessment can test the student's proficiency, such as reading rate, span of recognition at one or more reading rates, or comprehension at one or more reading rates. The assessment scores resulting from testing assessments administered by the level determination unit can be stored and/or used to set parameters of the mask 204 and slot 208. In addition, manually entered assessment scores can be stored. These assessment results can be accessed by selection of the View Assessment Results entry 520. For example, a teacher, principal, or school chancellor can access assessment results for a selected student, or students in a selected class, school, school district, state, etc.

Figure 6:
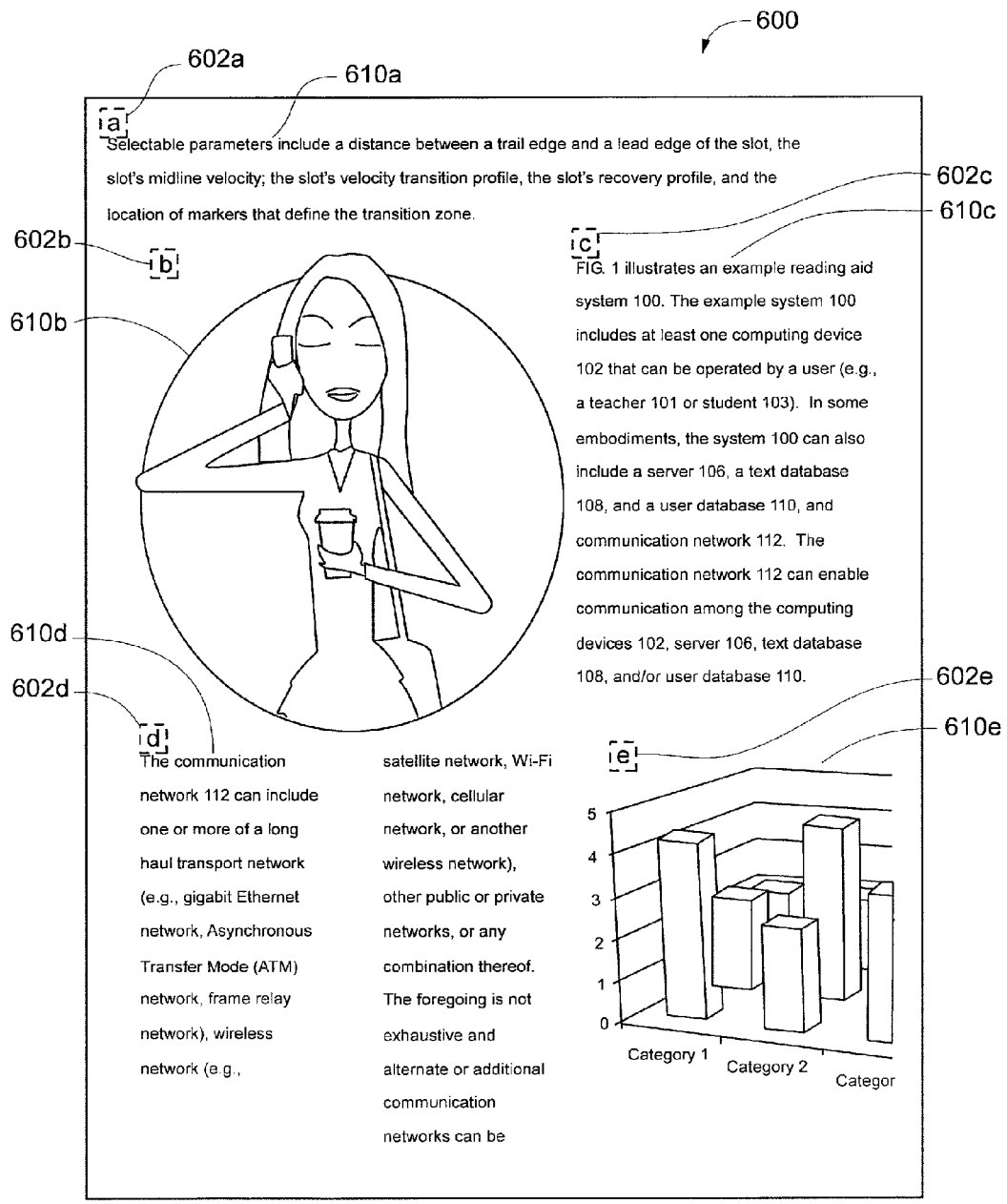
FIG. 6 illustrates a reading passage having embedded codes.

FIG. 6 shows a reading passage 600 displayed in window 202 without a mask, for brevity and clarity. The passage 600 includes one or more examples of computer readable embedded codes 602a-602e that correspond to respective portions 610a-610e of the reading passage 600. In some embodiments, each of the portions 610a-610e can also be considered a reading passage. While the embedded codes can be displayed, in the current example, the embedded codes 602a-602e are invisible to the reader. In an embodiment, the embedded codes can be stored, for example, as metadata associated with a file storing the reading passage 600. In another embodiment, the embedded codes can be stored in a table of codes that is associated with the file storing the reading passage 600. In another embodiment, the embedded codes can be stored in the reading passage in connection with the characters and/or portions of the reading passage.

The embedded codes 602a-602e are recognized and decoded by the code recognition unit 128 of reading aid unit 104. They can be recognized as the slot 208 advances through a reading passage, (e.g., portions 610a-610e), and decoded during the reading session. Alternatively, they can be recognized and decoded before advancement through the reading passage begins.

In an embodiment, the embedded codes 602a-602e can be embedded in the file storing the reading passage and recognized by the code recognition unit 128 as the slot 208 advances. The code recognition unit 128 can include a scout unit (not shown) that advances ahead of the slot 208. As the slot 208 advances, the scout unit can check a position ahead of the slot 208 for embedded codes 602a-602e.

In another embodiment, in which the embedded codes 602a-602e are recognized and decoded before the slot 208 begins to advance, the code recognition unit 128 can use embedded code information provided with the embedded code 602a-602e. The embedded code information can be used during slot advancement to recognize when each portion 610a-610e associated with an embedded code 602a-602e has been encountered.

The code recognition unit 128 determines information about the reading passage from the decoded codes 602a-602e and provides control information to the slot advancement unit 124 and/or to the slot generation unit 122 of reading aid unit 104. The control information controls advancement of the slot 208 and/or adjusts the mask parameters while the slot 208 advances through the corresponding portion. The codes 602a-602e can provide information about a corresponding portion of the reading passage 600, such as the reading difficulty level or density of information contained therein; a change in margins, format, or layout; whether the portion includes an image; or whether the portion includes information in a particular presentation, such as a graph, table, or equation.

The codes 602a-602e can include information that specifies the beginning and ending of the corresponding passage (e.g., portions 610a-610e). Alternatively, the codes 602a-602e can include a first code at the beginning of the corresponding portion and an associated code at the end of the corresponding portion that the code recognition unit 128 can use to determine where the corresponding portion begins and ends. Portions can overlap one another. For example, a portion can overlap or be nested within one or more of the other portions.

Code 602a provides information about portion 610a of the reading passage 600. The code 602a can indicate, for example, that portion (passage) 610a includes dense material, and that the midline velocity $V_{ML}$ and/or velocities of the profiles $P_{VT}$ and $P_{VR}$ should be decreased. The code 602a can further indicate the difficulty level. The code recognition unit 128 can adjust the velocities based on the difficulty level. Alternatively, the code 602a can indicate an amount by which to adjust the slot's 208 velocity (e.g., 10% or 20%).

Code 602b provides information about portion (passage) 610b of the reading passage 600. The code 602b can include information that indicates that portion 610b includes an image that the reader can view as a single unit, not line by line. The code recognition unit 128 can instruct slot advancement unit 124 to advance slot 208 by pausing the slot 208 for an interval that is appropriate for the reader to digest the information in the image, and then to skip to the end of portion 610b, and resume advancement at the next portion, portion 610c. Alternatively, code recognition unit 128 can instruct slot advancement unit 124 to advance slot 208 past portion 610b (e.g., above or below the image, without blocking the image). Thus, the reader can see the slot 208 as it advances. The reader can pace application of his/her attention to the image in order to be prepared to continue reading at the next portion 610c when the time allotted to "read" the image has passed. These techniques can be used to train a reader to gather information from an image at an effective pace, and to move his/her vision to the next portion of the reading passage 600.

Code 602c provides information about portion (passage) 610c of the passage 600. The code 602c can include information that indicates that the left margin of portion 610c is different than the left margin of reading passage 600 displayed in window 202. The code recognition unit 128 can inform the slot generation unit 122 to adjust parameters of the mask 204 accordingly. For example, adjustments can be made to margins that define the beginning and ending positions of the plurality of lines in portion 602c. The margins can describe the layout of the plurality of lines of text in the portion 610c so that the slot 208 can advance properly through portion 610c. Additionally, adjustments can be made to the placement of the first and second markers 220, 222 that define the transition zone 216 for portion 610c. It should be noted that each portion 602a-602c can include the markers 220, 222.

Code 602d provides information about portion (passage) 610d of the reading passage 600. The code 602d can include information that indicates that portion 610d has a layout that includes two columns. The code recognition unit 128 can instruct the slot generation unit 122 to adjust the margins describing the beginning and end positions of the plurality of lines in the two columns. Additionally, adjustments can be made to the first and second markers 220, 222 to provide a transition zone 216 for each of the columns. Additionally, the code recognition unit 128 can instruct the slot advancement unit 124 to advance the slot 208 in relation to the lines of the first column, followed by the lines of the second column.

Code 602e provides information about portion (passage) 610e of the reading passage 600. The code 602e can include information that indicates that portion 610e includes a graph that the reader should view and comprehend as a unit, not line by line, within a selectable time interval. Similar to the image in portion 610b, the code recognition unit 128 can instruct slot advancement unit 124 to advance slot 208 by pausing the slot 208 for an interval that is appropriate for the reader to digest the information in the graph, and then to skip to the end of portion 610e, and resume advancement at the next portion (not shown). Alternatively, code recognition unit 128 can instruct slot advancement unit 124 to advance slot 208 past portion 610e (e.g., above or below the graph, without blocking the graph). Thus, the reader can see the slot 208 as it advances. The reader can pace application of his/her attention to the graph so that the reader is prepared to continue reading at the next portion after the time allotted to "read" the graph has passed. These techniques can be used to train a reader to gather information from objects, such as graphs or tables, at an effective pace, and to move his/her vision to the next portion of the reading passage 600.

Figure 7A:
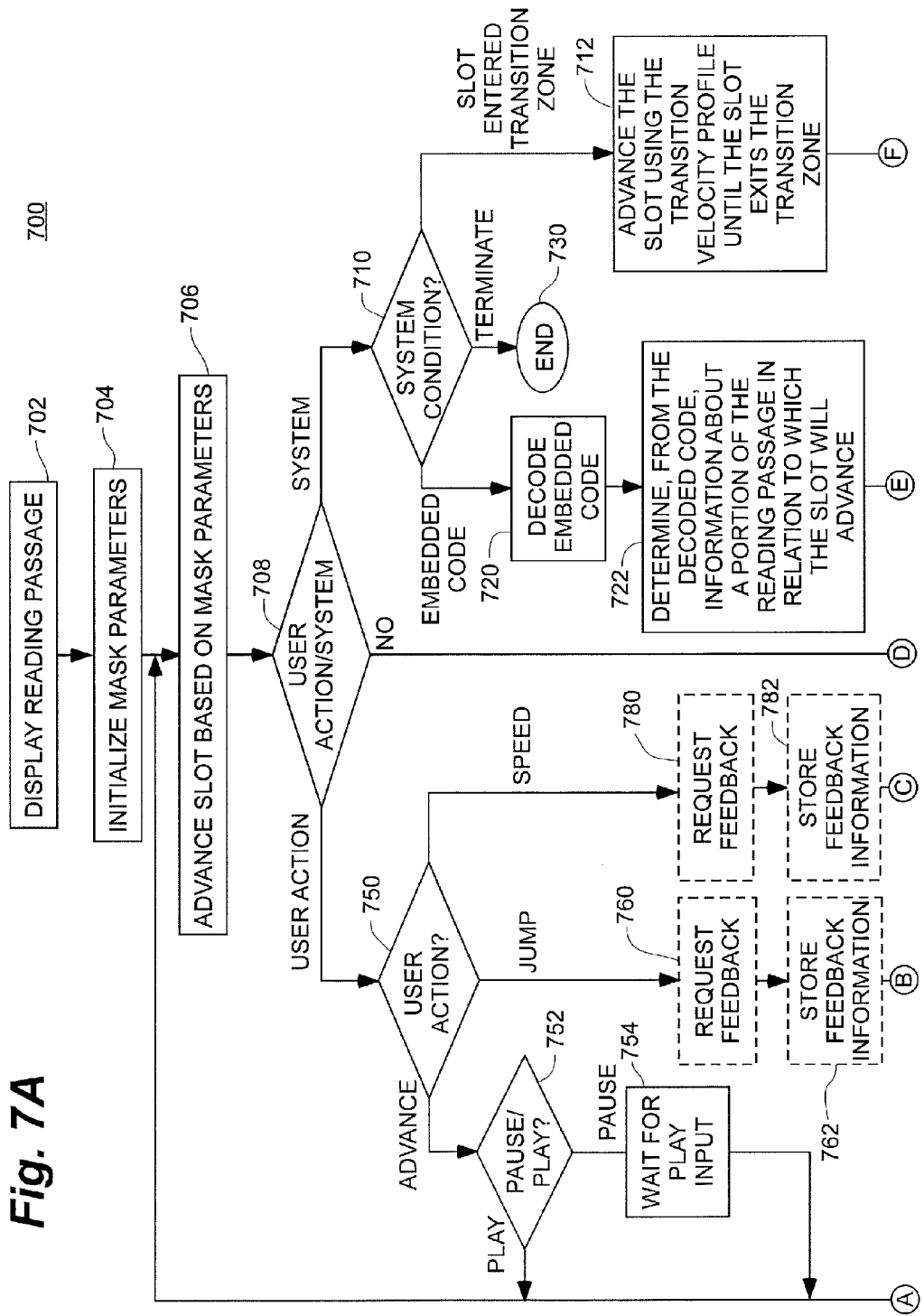
FIGS. 7A and 7B show a flowchart that illustrates an example method of the reading aid system shown in FIG. 1.
Figure 7B:
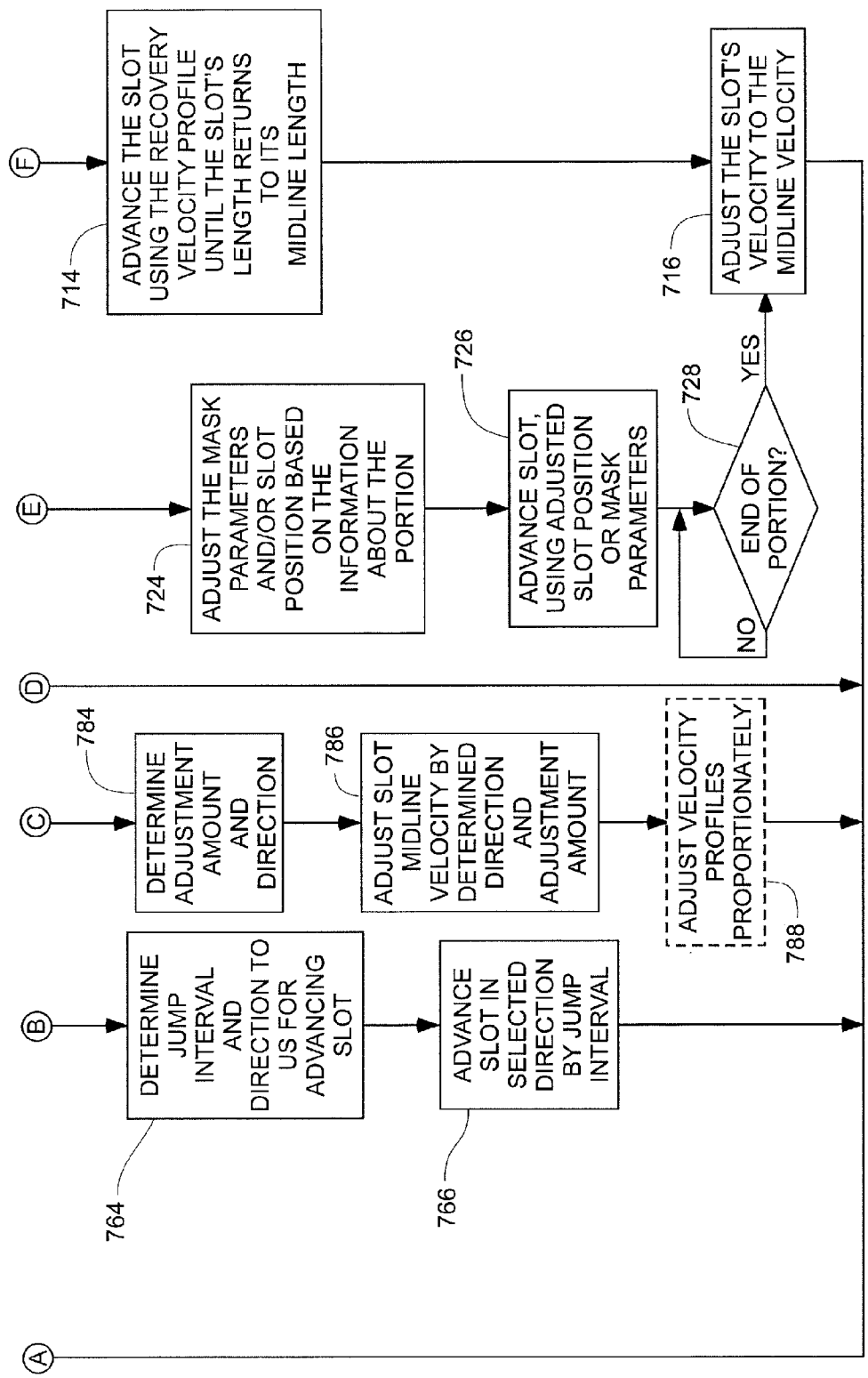

FIGS. 7A and 7B show a flowchart 700 that illustrates an example method of the reading aid system 100 shown in FIG. 1. With reference to FIGS. 2A and 5, at step 702, a selected reading passage is displayed in window 202. At step 704, the mask parameters are initialized, e.g., in accordance with the user's reading proficiency, characteristics of the reading portion (e.g., reading level and/or density), and/or user selections. At step 706, the slot 208 is advanced at its midline velocity $V_{ML}$ using the mask parameters for the phase ML 410.

At step 708, a determination is made whether a user action or system condition is recognized that indicates that the mask parameters should be adjusted. If it is determined that a component of the reading aid system 100 recognized a system condition, then execution of method 700 continues at step 710. At step 710, it is determined which system recognizable condition exists. If the determined system recognizable condition that slot 208 has encountered a transition zone 216, then execution of method 700 continues at step 712. For example, arrival of the slot 208 at the transition zone 216 can occur when the slot's lead edge 230 encounters the first marker 220 that marks the beginning of a transition zone 216.

At step 712, the slot 208 is advanced through phase T 412 using the transition velocity profile $P_{VT}$. Phase T 412 continues until it is determined that the slot 208 has exited the transition zone 216. The slot's 208 exit from the transition zone 216 can occur, for example, when the slot's lead edge 230 encounters the second marker 222 that demarks the end of the transition zone 216.

At step 714, the slot 208 is advanced through phase R 414 using the recovery velocity profile $P_{VR}$. Phase R 414 continues until the slot's 208 length returns to its midline length $L_{ML}$.

With reference to steps 712 and 714, in one embodiment, the transition and recovery velocity profiles $P_{VT}$, and $P_{VR}$ adjust the velocities of the slot's lead edge 230 and trail edge 232 at the same time and by the same amount. In this embodiment, the slot's 208 length remains the midline length $L_{ML}$ throughout steps 712 and 714, such that the recovery velocity profile $P_{VR}$, would not be used at step 714. Other embodiments are possible as described with reference to FIGS. 2A-6.

At step 716, the slot's 208 velocity is adjusted to its midline velocity $V_{ML}$, after which the method 700 continues at step 706 to advance the slot 208, in accordance with the mask parameters for the phase ML 410.

If it is determined at step 710 that the system recognizable condition is detection of an embedded code associated with a position encountered by the slot 208, then the method 700 continues at step 720, where the embedded code can be decoded, e.g., if this was not yet performed. At step 722, information about a portion of the reading passage in relation to which the slot will advance is determined based on (or from) the decoded code. The information about the portion of the reading passage can include, for example, the reading difficulty level or density of the portion; a change in margins, format, or layout within the portion; the presence of an image in the portion; or the presence of a particular presentation of reading material within the portion, such as a graph, table, or equation.

At step 724, when the portion that corresponds to the detected embedded code is encountered, the mask parameters and/or slot position 208 are adjusted based on the information about the portion (passage) of the reading passage 600 that corresponds to the detected embedded code. At step 726, the slot is advanced, using the adjusted slot position and/or mask parameters.

At step 728, a determination is made whether or not the slot 208 has advanced to the end of the portion. If it is determined at step 728 that slot 108 has encountered the end of the portion associated with the embedded code, the method 700 continues at step 716 to reset the slot's 208 velocity by adjusting it back to the midline velocity $V_{ML}$. Encountering the end of the portion by slot 208 can be determined, for example, based on the position of slot 208, information about the portion (e.g., obtained from the embedded code), a character(s) in the passage (e.g., a marker, symbol) or a characteristic of the passage encountered by the slot 208, or information provided in the file that stores the reading passage. Thereafter, the method 700 continues at step 706 to advance the slot 208 in accordance with the original mask parameters for the phase ML 410.

If it is determined at step 710 that the system recognized condition is a termination condition, then method 700 is terminated at step 730. A termination condition can occur, for example, when the slot 208 has advanced to the end of the displayed reading passage 600 (e.g., the end of a file storing a reading passage was encountered), or a timeout condition has occurred.

If at step 708 it is determined that a user action has caused a condition to occur, the method continues at step 750, where a determination is made as to which user action is recognized. A recognizable user action can occur, for example, when a user (e.g., a reader) operates user controls 550-554.

If it is determined at step 750 that the user activated the pause/play actuator 550, the method continues at step 752. At step 752, it is determined whether the user selected the pause or play function of the pause/play actuator 550. If it is determined that the user selected the pause function, then the method continues at step 754 to wait until the user selects the play function, after which the method continues at step 706. If it is determined at step 752 that the user selected the play function of the pause/play actuator 550, the method continues at step 706.

If at step 750 it is determined that the jump actuator 552 is selected, the method 700 continues at step 760, where a request can be generated and displayed to the user for feedback related to the reason that the reader activated the jump actuator 552. The feedback request can ask the user if the passage is too easy or difficult, whether the reading velocity set by the slot's advancement is too slow or fast, and/or whether there was an outside distraction that prompted the reader to activate the jump actuator 552. At step 762, the user's response is stored as feedback information in response to the request at step 760. The feedback information can be used when determining an interval and direction for jumping (advancing) the slot 208. Steps 760 and 762 are optional steps as shown in dashed lines.

At step 764, a jump interval and direction to be used for advancing the slot 208 are determined. The jump interval can be a predetermined interval, which can be retrieved from a storage location. The jump interval can further be determined based on the "sequence of activation" in which the user activated the jump actuator 552. For example, the jump interval can be determined based on how many times the user activated the jump actuator 552 (e.g., "clicked on" in quick succession). For example, the jump interval to be used for jumping the slot 208 can be determined by multiplying the predetermined interval by the number of times the user "clicked on" the jump actuator 552 in quick succession.

In one example, when the jump actuator 552 is selected, the slot 208 is jumped (e.g., repositioned) to a position in the reading passage. The slot can be jumped to the beginning or ending of a component of the reading passage, such as the word, line, paragraph, page, or reading passage at which the slot 208 was positioned when the jump actuator 552 was actuated. For example, when the jump actuator 552 pointing to the "left" is actuated, the slot 208 can be jumped to the beginning of the word, line, paragraph, or reading passage in which the slot 208 is located at the time of the actuation. Similarly, when the jump actuator 552 pointing to the "right" is actuated, the slot 208 can be jumped to the end of the line, paragraph, or reading passage in which the slot 208 is located at the time of the actuation.

The direction to be used for advancing the slot 208 is determined based on which jump actuator 552 the user activated. In the present example, the jump actuator 552 having a symbol that points to the "right" will cause the slot 208 to be advanced in the "right" direction, and the jump actuator 552 having a symbol that points to the "left" will cause the slot 208 to be advanced in the "left" direction, in a left-to-right passage 600. At step 766, the slot 208 is advanced to a new position by the selected jump interval in the selected direction, after which the method continues at step 706.

If at step 750 it is determined that the velocity adjustment actuator 554 is selected, the method 700 continues at step 780, where a request can be generated and displayed to the user for feedback related to the reason that the reader activated the velocity adjustment actuator 554. The feedback request can ask the user if the passage is too easy or difficult, whether the reading velocity set by the slot's advancement is too slow or fast, and/or whether there was an outside distraction that prompted the reader to activate the velocity adjustment actuator 554. At step 782, the user's response is stored as feedback information in response to the request at step 780. The feedback information can be used when determining an amount and direction by which to adjust the velocity of the slot 208. For example, the feedback information can be used to determine an adjustment to the midline velocity $V_{ML}$, the velocity of at least one of the slot's lead or trail edges of the slot's transition velocity profile $P_{VT}$, the velocity of at least one of the slot's lead or trail edges of the slot's recovery velocity profile $P_{VR}$, the mask parameters, and/or the slot's 208 position. Steps 780 and 782 are optional steps as shown in dashed lines.

At step 784, the velocity adjustment amount and direction to be used for adjusting the advancement velocity of the slot 208 are determined. The amount can be a predetermined amount, which can be retrieved from a storage location. The amount can further be determined based on the "sequence of activation" in which the user activated the velocity adjustment actuator 554. For example, the amount can be determined based on how many times the user activated the velocity adjustment actuator 554 (e.g., "clicked on" in quick succession). For example, the amount to be used for adjusting the advancement velocity of the slot 208 can be determined by multiplying the predetermined amount by the number of times the user "clicked on" the velocity adjustment actuator 554 in quick succession. The direction to be used for adjusting the velocity of the slot 208 is determined based on which velocity adjustment actuator 554 the user activated. In the present example, the velocity adjustment actuator 554 having the symbol "+" displayed thereon will cause the velocity of the slot 208 to be increased, and the actuator having the "−" symbol displayed thereon will cause the velocity of the slot 208 to be decreased.

At step 786, the midline velocity $V_{ML}$ of the slot 208 is adjusted in the selected direction by the selected amount. The velocity adjustment may occur immediately while the slot 208 is advanced in accordance with the midline phase and before the slot 208 advances to a next line. However, if the slot 208 has already entered the transition zone 216, e.g., during a transition phase, then the velocity adjustment will become effective after the transition phase.

At step 788, the transition and recovery velocity profiles $P_{VT}$, $P_{VR}$ can be optionally adjusted, e.g., proportionately, to the adjustment of the midline velocity $V_{ML}$. The adjustment to $P_{VT}$, $P_{VR}$ can occur immediately, so that it is effective the next time that the slot 208 enters the transition zone 216. However, if the slot 208 has already entered the transition zone 216, then the adjustment can become effective when the slot 208 advances to the next transition zone. Step 788 is an optional step. Thereafter, the method 700 continues at step 706.

If at step 708 it is determined that a user action and a system condition were not detected, the method continues at step 706.

Figure 8:
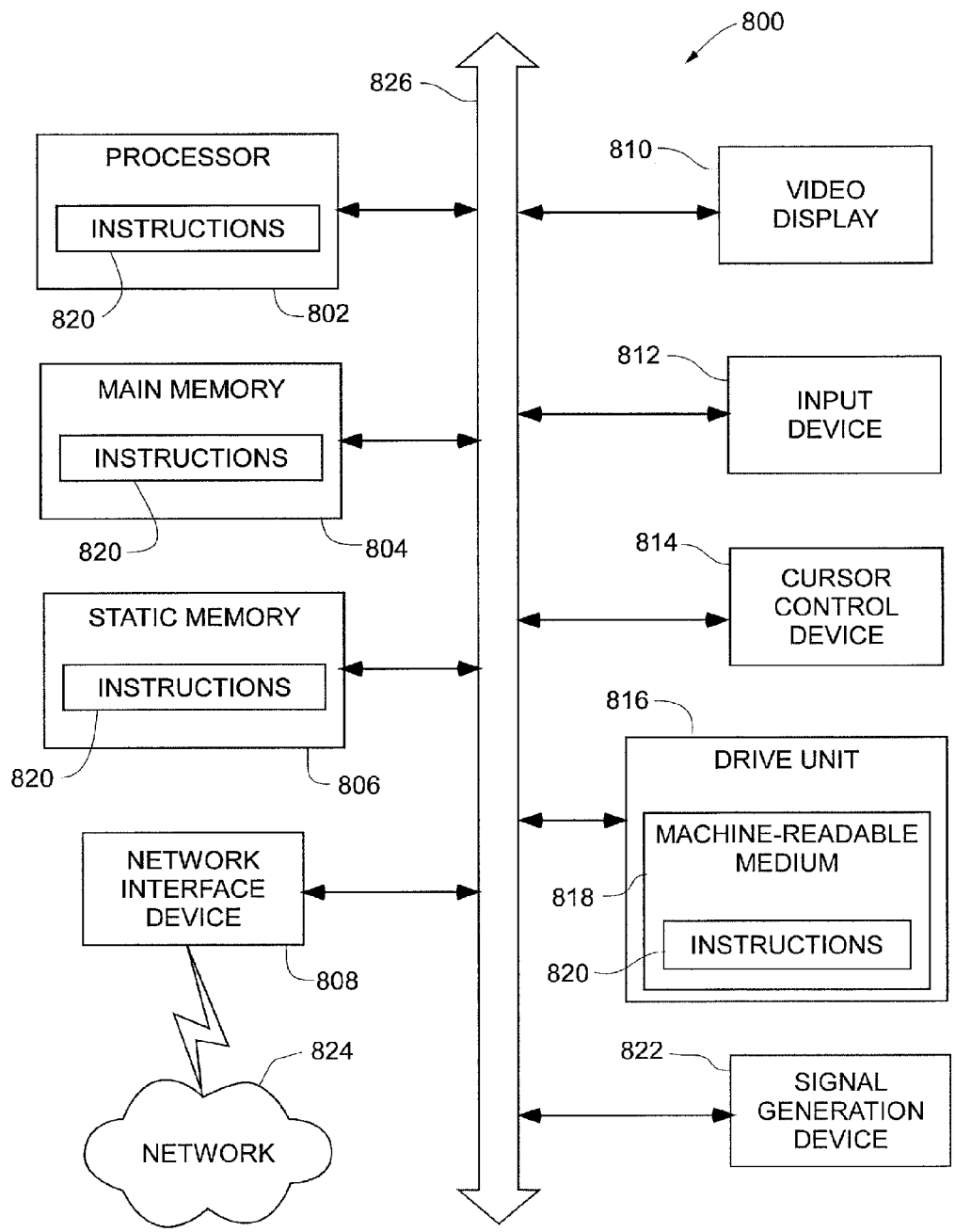
FIG. 8 is a block diagram of an illustrative embodiment of a general computer system.

FIG. 8 is a block diagram of an illustrative embodiment of a general computer system 800. The computer system 800 can be the computing device 102 and the server 106 illustrated in FIG. 1. The computer system 800 can include a set of instructions that can be executed to cause the computer system 800 to perform any one or more of the methods or computer based functions disclosed herein. The computer system 800, or any portion thereof, may operate as a standalone device or may be connected, e.g., using a network or other connection, to other computer systems or peripheral devices. For example, the computer system 800 may be operatively connected to a different computing device 102, a different server 106, or databases 108 and 110.

The computer system 800 may also be implemented as or incorporated into various devices, such as a personal computer (PC), a tablet PC, a personal digital assistant (PDA), a mobile device, a palmtop computer, a laptop computer, a desktop computer, a communications device, a control system, a web appliance, or any other machine capable of executing a set of instructions (sequentially or otherwise) that specify actions to be taken by that machine. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics-processing unit (GPU), or both. Moreover, the computer system 800 may include a main memory 804 and a static memory 806 that can communicate with each other via a bus 826. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. The computer system 800 can also include a disk drive unit 816, a signal generation device 822, such as a speaker or remote control, and a network interface device 808.

In a particular embodiment or aspect, as depicted in FIG. 8, the disk drive unit 816 may include a computer-readable medium 818 in which one or more sets of instructions 820, e.g., software, can be embedded. Further, the instructions 820 may embody one or more of the methods or logic as described herein. In a particular embodiment or aspect, the instructions 820 may reside completely, or at least partially, within the main memory 804, the static memory 806, and/or within the processor 802 during execution by the computer system 800. The main memory 804 and the processor 802 also may include computer-readable media.

In an alternative embodiment or aspect, dedicated hardware implementations, such as application specific integrated circuits, programmable logic arrays and other hardware devices, can be constructed to implement one or more of the methods described herein. Applications that may include the apparatus and systems of various embodiments or aspects can broadly include a variety of electronic and computer systems. One or more embodiments or aspects described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments or aspects, the methods described herein may be implemented by software programs tangibly embodied in a processor-readable medium and may be executed by a processor. Further, in an exemplary, non-limited embodiment or aspect, implementations can include distributed processing, component/object distributed processing, and parallel processing. Alternatively, virtual computer system processing can be constructed to implement one or more of the methods or functionality as described herein.

It is also contemplated that a computer-readable medium includes instructions 820 or receives and executes instructions 820 responsive to a propagated signal, so that a device connected to a network 824 can communicate voice, video or data over the network 824. Further, the instructions 820 may be transmitted or received over the network 824 via the network interface device 808.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, example embodiment or aspect, the computer-readable medium can include a solid-state memory, such as a memory card or other package, which houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals, such as a signal communicated over a transmission medium. A digital file attachment to an e-mail or other self-contained information archive or set of archives may be considered a distribution medium that is equivalent to a tangible storage medium. Accordingly, any one or more of a computer-readable medium or a distribution medium and other equivalents and successor media, in which data or instructions may be stored, are included herein.

In accordance with various embodiments or aspects, the methods described herein may be implemented as one or more software programs running on a computer processor. Dedicated hardware implementations including, but not limited to, application specific integrated circuits, programmable logic arrays, and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, a tangible storage medium or distribution medium as listed herein, and other equivalents and successor media, in which the software implementations herein may be stored, are included herein.

Thus, system and method to reconstruct cardiac activation information have been described. Although specific example embodiments or aspects have been described, it will be evident that various modifications and changes may be made to these embodiments or aspects without departing from the broader scope of the invention. Accordingly, the specification and drawings are to be regarded in an illustrative rather than a restrictive sense. The accompanying drawings that form a part hereof, show by way of illustration, and not of limitation, specific embodiments or aspects in which the subject matter may be practiced. The embodiments or aspects illustrated are described in sufficient detail to enable those skilled in the art to practice the teachings disclosed herein. Other embodiments or aspects may be utilized and derived therefrom, such that structural and logical substitutions and changes may be made without departing from the scope of this disclosure. This Detailed Description, therefore, is not to be taken in a limiting sense, and the scope of various embodiments or aspects is defined only by the appended claims, along with the full range of equivalents to which such claims are entitled.

Such embodiments or aspects of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments or aspects have been illustrated and described herein, it should be appreciated that any arrangement calculated to achieve the same purpose may be substituted for the specific embodiments or aspects shown. This disclosure is intended to cover any and all adaptations or variations of various embodiments or aspects. Combinations of the above embodiments or aspects, and other embodiments or aspects not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments or aspects, various features are grouped together in a single embodiment for the purpose of streamlining the disclosure. This method of disclosure is not to be interpreted as reflecting that the claimed embodiments or aspects have more features than are expressly recited in each claim. Rather, as the following claims reflect, inventive subject matter lies in less than all features of a single disclosed embodiment or aspect. Thus the following claims are hereby incorporated into the Detailed Description, with each claim standing on its own as a separate example embodiment or aspect. It is contemplated that various embodiments or aspects described herein can be combined or grouped in different combinations that are not expressly noted in the Detailed Description. Moreover, it is further contemplated that claims covering such different combinations can similarly stand on their own as separate example embodiments or aspects, which can be incorporated into the Detailed Description.

The invention claimed is:

1. A computerized method of controlling a reading slot to provide aid to a user in reading a passage, wherein the method comprises:
generating, by a processing device, a mask having an opaque portion and the slot, the opaque portion covering a plurality of lines having characters that are visible through the slot, the plurality of lines including at least a first line and a second line, the slot including a lead edge and an opposing trail edge that define a length dimension having a first length between the lead edge and the trail edge of the slot;
advancing, by the processing device, the slot at a midline velocity in relation to the first line of the passage; and
increasing, by the processing device, the velocity of at least one of the lead edge and the trail edge of the slot in accordance with a digital transition velocity profile when the slot enters a transition zone of the passage from the first line to the second line, wherein increasing the velocity increases the length dimension between the lead edge and the trail edge from the first length to a second length.

2. The method according to claim 1, wherein the method further comprises displaying the mask over the plurality of lines.

3. The method according to claim 1, wherein the method further comprises accessing reading proficiency of the user.

4. The method according to claim 3, wherein the method further comprises determining an opacity level of the mask based on the reading proficiency of the user.

5. The method according to claim 3, wherein the method further comprises determining and selecting the midline velocity based on the reading proficiency of the user.

6. The method according to claim 3, wherein the method further comprises determining the length dimension of the slot based on the reading proficiency of the user.

7. The method according to claim 3, wherein the slot includes a translucent portion and a semi-opaque portion, wherein the method further comprises setting at least one of a length dimension of the semi-opaque portion and a degree of opaqueness of the semi-opaque portion based on the reading proficiency of the user.

8. The method according to claim 1, wherein the method further comprises determining when the slot enters the transition zone based on a marker associated with the first line of the passage.

9. The method according to claim 1, wherein the method further comprises decreasing the velocity of at least one of the slot's lead and trail edges such that the length dimension decreases between the slot's lead and trail edges in accordance with the transition velocity profile until the length dimension reaches a predetermined dimension.

10. The method according to claim 1, wherein the method further comprises adjusting the velocity of the slot's lead and trail edges at different times.

11. The method according to claim 1, wherein the method further comprises decreasing the velocity of at least one of the slot's lead and trail edges in accordance with a digital recovery velocity profile when the slot exits the transition zone.

12. The method according to claim 1, wherein the method further comprises determining when the slot exits the transition zone based on a marker associated with the second line of the passage.

13. The method according to claim 1, wherein the method further comprises adjusting at least one of the slot's position or advancement based on a code related to the passage, wherein the code is embedded in the passage or is associated with the passage.

14. The method according to claim 1, wherein the method further comprises:
receiving a request to adjust one of: a position of the slot, the velocity of the slot, and a velocity of at least one of a lead edge or trail edge of the slot; and
adjusting at least one of: the slot position, the velocity of the slot, and the velocity of the at least one of the lead edge and trail edge of the slot.

15. The method according to claim 14, wherein the method further comprises:
receiving feedback information from the user in response to the request to adjust; and
adjusting, based on the feedback information, at least one of: a selected distance for position of the slot, an amount for velocity of the slot, an amount for the velocity of the lead edge and trail edge of the slot.

16. A system to control a reading slot to provide aid to a user in reading a passage, the system comprising:
a processor; and
a memory storing instructions that, when executed by the processor, cause the processor to perform operations comprising:
generating a mask having an opaque portion and the slot, the opaque portion to cover a plurality of lines having characters that are visible through the slot, the plurality of lines including at least a first line and a second line, the slot including a lead edge and an opposing trail edge that define a length dimension having a first length between the lead edge and the trail edge of the slot;
advancing the slot at a midline velocity in relation to the first line of the passage; and
increasing the velocity of at least one of the lead edge and the trail edge of the slot in accordance with a digital transition velocity profile when the slot enters a transition zone of the passage, wherein increasing the velocity increases the length dimension between the lead edge and the trail edge from the first length to a second length.

17. The system according to claim 16, wherein the operations further comprise displaying the mask over the plurality of lines.

18. The system according to claim 16, wherein the operations further comprise accessing reading proficiency of the user.

19. The system according to claim 18, wherein the operations further comprise determining an opacity level of the mask based on the reading proficiency of the user.

20. The system according to claim 18, wherein the operations further comprise determining the midline velocity based on the reading proficiency of the user.

21. The system according to claim 18, wherein the operations further comprise determining the length dimension of the slot based on the reading proficiency of the user.

22. The system according to claim 18, wherein the slot includes a translucent portion and a semi-opaque portion, wherein the operations further comprise setting at least one of a length dimension of the semi-opaque portion and a degree of opaqueness of the semi-opaque portion based on the reading proficiency of the user.

23. The system according to claim 16, wherein the operations further comprise determining when the slot enters the transition zone based on a marker associated with the first line of the passage.

24. The system according to claim 16, wherein the operations further comprise decreasing the velocity of at least one of the slot's lead and trail edges such that a length dimension decreases between the slot's lead and trail edges in accordance with the transition velocity profile until the length dimension reaches a predetermined dimension.

25. The system according to claim 16, wherein the operations further comprise adjusting the velocity of the slot's lead and trail edges at different times.

26. The system according to claim 16, wherein the operations further comprise decreasing the velocity of at least one of the slot's lead and trail edges in accordance with a digital recovery velocity profile when the slot exits the transition zone.

27. The system according to claim 16, wherein the operations further comprise determining when the slot exits the transition zone based on a marker associated with the second line of the passage.

28. The system according to claim 16, wherein the operations further comprise adjusting at least one of the slot's position or advancement based on a code related to the passage, wherein the code is embedded in the passage or is associated with the passage.

29. The system according to claim 16, wherein the operations further comprise:
receiving a request to adjust one of: a position of the slot, the velocity of the slot, and a velocity of at least one of a lead edge or trail edge of the slot; and
adjusting at least one of: the slot position, the velocity of the slot, and the velocity of the at least one of the lead edge and trail edge of the slot.

30. The system according to claim 29, wherein the operations further comprise:
receiving feedback information from the user in response to the request to adjust; and
adjusting, based on the feedback information, at least one of: a selected distance for the position of the slot, an amount for velocity of the slot, and an amount for the velocity of the at least one of the lead edge and trail edge of the slot.

31. A method of controlling a reading slot to provide aid to a user in reading a passage, wherein the method comprises:
determining, by a processing device, a length dimension associated with the slot based at least on a reading proficiency of the user;
generating, by the processing device, a mask having an opaque portion and the slot, the opaque portion covering a plurality of lines having characters that are visible through the slot, the plurality of lines including at least a first line and a second line, the slot including a lead edge and an opposing trail edge defined according to the length dimension between the lead edge and the trail edge of the slot;
advancing, by the processing device, the slot at a midline velocity in relation to the first line of the passage; and
increasing, by the processing device, the velocity of the slot in accordance with a digital transition velocity profile when the slot enters a transition zone of the passage from the first line to the second line.

32. The method according to claim 31, wherein increasing the velocity of the slot comprises increasing the length dimension between the lead edge and the trail edge.

* * * * *